United States Patent
Deshpande et al.

(10) Patent No.: US 12,547,644 B2
(45) Date of Patent: Feb. 10, 2026

(54) OPTIMIZED PRIVATE ID MATCHING BETWEEN ENTITIES

(71) Applicant: Snap Inc., Santa Monica, CA (US)

(72) Inventors: Apoorvaa Deshpande, Mountain View, CA (US); Bijeeta Pal, New York, NY (US); Antonios Papadimitriou, Los Angeles, CA (US); Sina Shiehian, Berkeley, CA (US)

(*) Notice: Subject to any disclaimer, the term of this patent is extended or adjusted under 35 U.S.C. 154(b) by 67 days.

(21) Appl. No.: 18/353,609

(22) Filed: Jul. 17, 2023

(65) Prior Publication Data
US 2024/0378218 A1 Nov. 14, 2024

(30) Foreign Application Priority Data
May 11, 2023 (GR) .............................. 20230100380

(51) Int. Cl.
*G06F 16/28* (2019.01)
*H04L 9/14* (2006.01)

(52) U.S. Cl.
CPC .............. *G06F 16/285* (2019.01); *H04L 9/14* (2013.01); *H04L 2209/46* (2013.01)

(58) Field of Classification Search
CPC ...... G06F 16/285; H04L 2209/46; H04L 9/14
See application file for complete search history.

(56) References Cited

U.S. PATENT DOCUMENTS

| 2016/0078446 A1* | 3/2016 | Trostle ................ G06Q 20/108 705/30 |
| 2022/0004654 A1 | 1/2022 | Patel et al. |
| 2022/0261501 A1 | 8/2022 | Daub et al. |
| 2023/0188329 A1* | 6/2023 | Yeo ...................... H04L 9/0841 713/193 |

FOREIGN PATENT DOCUMENTS

CN 114547082 5/2022

OTHER PUBLICATIONS

"International Application Serial No. PCT/US2024/028384, International Search Report mailed Sep. 13, 2024", 3 pgs.
"International Application Serial No. PCT/US2024/028384, Written Opinion mailed Sep. 13, 2024", 8 pgs.
(Continued)

*Primary Examiner* — Taelor Kim
(74) *Attorney, Agent, or Firm* — SCHWEGMAN LUNDBERG & WOESSNER, P.A.

(57) ABSTRACT

Methods and systems are disclosed for performing private identification matching. The methods and systems store, by a first entity, a first set of private identifiers associated with a first set of data. The methods and systems group, by the first entity, different subsets of the first set of private identifiers into respective buckets of a first plurality of buckets according to a grouping criterion. The methods and systems apply a function to a subset of a second set of data, stored by a second entity, corresponding to private identifiers associated with one or more buckets of a second plurality of buckets, grouped by the second entity, that match private identifiers associated with one or more buckets of the first plurality of buckets. The methods and systems provide, to the first entity, a result of applying the function to the subset of the second set of data.

19 Claims, 12 Drawing Sheets

(56) References Cited

OTHER PUBLICATIONS

"FBPSF (Facebook Private Computation Framework)", facebookresearch/fbpcf, GitHub, [Online]. Retrieved from the Internet: <URL: https://web.archive.org/web/20220318030855/https://github.com/facebookresearch/fbpcf>, (Archived on Mar. 18, 2022), 13 pgs.

"PCS (Private Computation Solutions)", facebookresearch/fbpcs, GitHub, [Online]. Retrieved from the Internet: <URL: https://web.archive.org/web/20221205202939/https://github.com/facebookresearch/fbpcs>, (Archived on Dec. 5, 2022), 3 pgs.

"Private-ID", facebookresearch/Private-ID, GitHub, [Online]. Retrieved from the Internet: <URL: https://web.archive.org/web/20221018005522/https://github.com/facebookresearch/Private-ID>, (Archived on Oct. 18, 2022), 6 pgs.

Duan, Xiaoqi, et al., "ACCO: Algebraic Computation with Comparison", CCSW '21, Virtual Event, Republic of Korea, (Nov. 15, 2021), 21-38.

\* cited by examiner

OPTIMIZED PRIVATE ID MATCHING BETWEEN ENTITIES

CLAIM OF PRIORITY

This application claims the benefit of priority to Greece Patent Application Serial No. 20230100380, filed on May 11, 2023, which is incorporated herein by reference in its entirety.

TECHNICAL FIELD

The present disclosure relates to computing a function of data from multiple entities while maintaining data privacy.

BACKGROUND

Secure multiparty computation (MPC) is a cryptographic framework that allows a set of mutually distrusting parties to compute a function of their joint private inputs without revealing anything except the output of the function. This is achieved by distributing the computation among the parties in such a way that no party can learn anything more than what can be inferred from the output of the function. MPC protocols are designed to provide strong security guarantees even in the presence of malicious participants and can be used to solve a wide range of problems in privacy-preserving computation.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
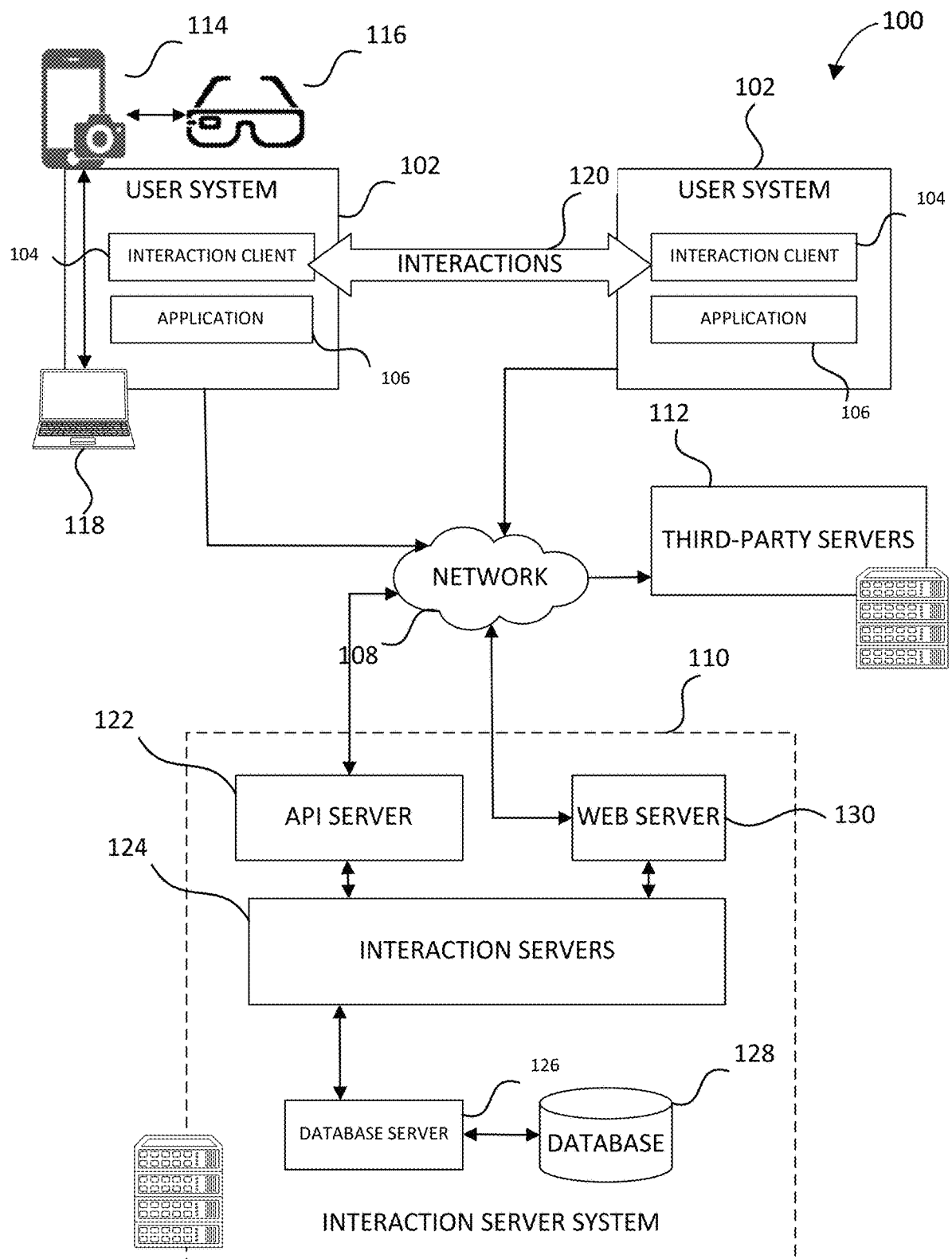
FIG. 1 is a diagrammatic representation of a networked environment in which the present disclosure may be deployed, according to some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

Typical systems allow different entities to compute a function of their data in a privacy preserving manner according to the MPC protocol and framework. For example, a first entity may have a list of users and their respective private information and a second entity may have another list of users (some of which overlap with the list of users of the first entity) and their respective private information. The private information stored by the second entity may be collected independently of the first entity and may need to have privacy guarantees preserved. The first entity may need to obtain knowledge about some of the information collected by the second entity for the list of users of the first entity without revealing the actual private information collected by the second entity. For example, the first entity may need to obtain an aggregation or sum representing the information collected by the second entity.

To do so, typically, the first entity may provide identities of the list of users of the first entity and a requested operation (e.g., a function) to the MPC protocol and framework. In response to receiving the requested operation, the MPC protocol communicates with the second entity and generates a list of private identifiers for users of the first entity and users of the second entity and then determines the private identifiers that are common to both entities to compute the requested operation. The MPC protocol then returns a result of the requested operation back to the first entity without revealing contents of the private identifiers or any other private information received from the second entity. Namely, the private identifiers are not returned to the first or second entities and are not stored by the first or second entities. While this approach generally works well, such an approach does not scale with large datasets and is incredibly inefficient when multiple functions need to be computed on an ongoing basis. This is because, for each function, the MPC protocol needs to be called and needs to have access to the list of users of the first entity to recompute the private identifiers and determine the set of common private identifiers for generating the result. Recomputing the same set of data (e.g., the private identifiers) each time the MPC protocol is accessed or called is incredibly inefficient and wastes system resources, which reduces the scalability of such systems.

The disclosed techniques seek to improve the way in which the MPC protocol is used by increasing the overall efficiency of the MPC protocol across multiple requests associated with a same collection or pair of entities. The disclosed techniques store, by a first entity, a first set of private identifiers associated with a first set of data. The disclosed techniques group, by the first entity, different subsets of the first set of private identifiers into respective buckets of a first plurality of buckets according to a grouping criterion. The disclosed techniques apply a function to a subset of a second set of data, stored by a second entity, corresponding to private identifiers associated with one or more buckets of a second plurality of buckets, grouped by the second entity, that match private identifiers associated with one or more buckets of the first plurality of buckets. The disclosed techniques provide, to the first entity, a result of applying the function to the subset of the second set of data.

Namely, according to the disclosed techniques, all of the entities store private identifiers for their respective users. These private identifiers are used to generate buckets to reduce exposure to the private identifiers between the entities. Only bucket identifiers are exchanged between the entities and are used to determine a set intersection of possible private identifiers that are common to all the entities. This possible set of private identifiers that are common is then provided to the MPC protocol to compute a desired function of the private information stored by the entities and to provide a result to the requesting entity or entities. In this way, the number of computations that need to be performed by the MPC protocol each time a function is requested to be computed is reduced, which improves the overall efficiencies of the system. This results in computation of functions in a private manner faster and more efficiently, which preserves and reduces the number of resources needed to accomplish a task.

Networked Computing Environment

FIG. 1 is a block diagram showing an example interaction system 100 for facilitating interactions (e.g., exchanging text messages, conducting text audio and video calls, or playing games) over a network. The interaction system 100 includes multiple user systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, entity relationship information, and live event information. Data exchanges within the interaction system 100 are invoked and controlled through functions available via user interfaces of the interaction clients 104.

Turning now specifically to the interaction server system 110, an API server 122 is coupled to and provides programmatic interfaces to interaction servers 124, making the functions of the interaction servers 124 accessible to interaction clients 104, other applications 106, and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over Hypertext Transfer Protocol (HTTP) and several other related protocols.

The API server 122 receives and transmits interaction data (e.g., commands and message payloads) between the interaction servers 124 and the user systems 102 (and, for example, interaction clients 104 and other application 106) and the third-party server 112. Specifically, the API server 122 provides a set of interfaces (e.g., routines and protocols) that can be called or queried by the interaction client 104 and other applications 106 to invoke functionality of the interaction servers 124. The API server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity relationship graph (e.g., the entity graph 310); the location of friends within an entity relationship graph; and opening an application event (e.g., relating to the interaction client 104).

The interaction servers 124 host multiple systems and subsystems, described below with reference to FIG. 2.

Linked Applications

Returning to the interaction client 104, features and functions of an external resource (e.g., a linked application 106 or applet) are made available to a user via an interface of the interaction client 104. In this context, "external" refers to the fact that the application 106 or applet is external to the interaction client 104. The external resource is often provided by a third party but may also be provided by the creator or provider of the interaction client 104. The interaction client 104 receives a user selection of an option to launch or access features of such an external resource. The external resource may be the application 106 installed on the user system 102 (e.g., a "native app"), or a small-scale version of the application (e.g., an "applet") that is hosted on the user system 102 or remote of the user system 102 (e.g., on third-party servers 112). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 104 determines whether the selected external resource is a web-based external resource or a locally-installed application 106. In some cases, applications 106 that are locally installed on the user system 102 can be launched independently of and separately from the interaction client 104, such as by selecting an icon corresponding to the application 106 on a home screen of the user system 102. Small-scale versions of such applications can be launched or accessed via the interaction client 104 and, in some examples, no or limited portions of the small-scale application can be accessed outside of the interaction client 104. The small-scale application can be launched by the interaction client 104 receiving, from a third-party server 112 for example, a markup-language document associated with the small-scale application and processing such a document.

In response to determining that the external resource is a locally-installed application 106, the interaction client 104 instructs the user system 102 to launch the external resource by executing locally-stored code corresponding to the external resource. In response to determining that the external resource is a web-based resource, the interaction client 104 communicates with the third-party servers 112 (for example) to obtain a markup-language document corresponding to the selected external resource. The interaction client 104 then processes the obtained markup-language document to present the web-based external resource within a user interface of the interaction client 104.

The interaction client 104 can notify a user of the user system 102, or other users related to such a user (e.g., "friends"), of activity taking place in one or more external resources. For example, the interaction client 104 can provide participants in a conversation (e.g., a chat session) in the interaction client 104 with notifications relating to the current or recent use of an external resource by one or more members of a group of users. One or more users can be invited to join in an active external resource or to launch a recently used but currently inactive (in the group of friends) external resource. The external resource can provide participants in a conversation, each using respective interaction clients 104, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 104. The external resource can selectively include different media items in the responses, based on a current context of the external resource.

The interaction client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

Figure 2:
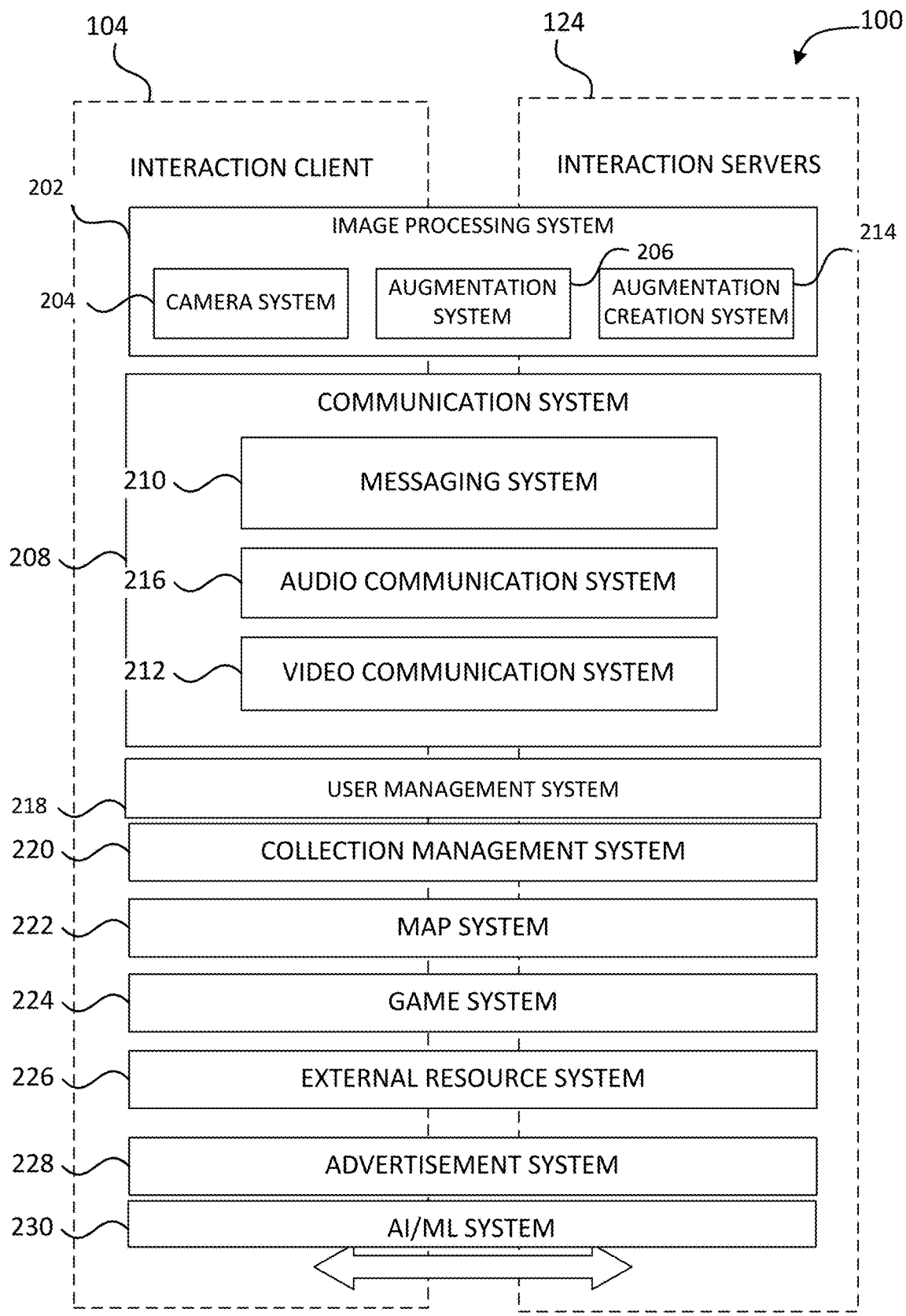
FIG. 2 is a diagrammatic representation of a messaging system that has both client-side and server-side functionality, according to some examples.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. Example subsystems are discussed below and can include a private identifier function system 500 that computes a function of private data stored by different entities in a privacy preserving manner. In some examples, a first of the entities can be a provider of the interaction client 104 and a second of the entities can be a provider of a third-party application and/or advertisement system. An illustrative implementation of the private identifier function system 500 is shown and described in connection with FIG. 5 below.

In some examples, these subsystems are implemented as microservices. A microservice subsystem (e.g., a microservice application) may have components that enable it to operate independently and communicate with other services. Example components of a microservice subsystem may include:

Function logic: The function logic implements the functionality of the microservice subsystem, representing a specific capability or function that the microservice provides.

API interface: Microservices may communicate with other components through well-defined APIs or interfaces, using lightweight protocols such as REST or messaging. The API interface defines the inputs and outputs of the microservice subsystem and how it interacts with other microservice subsystems of the interaction system 100.

Data storage: A microservice subsystem may be responsible for its own data storage, which may be in the form of a database, cache, or other storage mechanism (e.g., using the database server 126 and database 128). This enables a microservice subsystem to operate independently of other microservices of the interaction system 100.

Service discovery: Microservice subsystems may find and communicate with other microservice subsystems of the interaction system 100. Service discovery mechanisms enable microservice subsystems to locate and communicate with other microservice subsystems in a scalable and efficient way.

Monitoring and logging: Microservice subsystems may need to be monitored and logged in order to ensure availability and performance. Monitoring and logging mechanisms enable the tracking of health and performance of a microservice subsystem.

In some examples, the interaction system 100 may employ a monolithic architecture, a service-oriented architecture (SOA), a function-as-a-service (FaaS) architecture, or a modular architecture:

An image processing system 202 provides various functions that enable a user to capture and augment (e.g., annotate or otherwise modify or edit) media content associated with a message.

A camera system 204 includes control software (e.g., in a camera application) that interacts with and controls camera hardware (e.g., directly or via operating system controls) of the user system 102 to modify and augment real-time images captured and displayed via the interaction client 104.

An augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 1202 (shown in FIG. 12) of a user system 102. These augmentations are selected by the augmentation system 206 and presented to a user of an interaction client 104, based on a number of inputs and data, such as for example:

Geolocation of the user system 102; and
Entity relationship information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of a communication system 208, such as a messaging system 210 and a video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

An augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within a user management system 218) that, based on duration and display parameters associated with a message or collection of messages (e.g., a story), selectively enable access (e.g., for presentation and display) to messages and associated content via the interaction client 104. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 218 is operationally responsible for the management of user data and profiles, and maintains entity information (e.g., stored in entity tables 308, entity graphs 310, and profile data 302) regarding users and relationships between users of the interaction system 100.

A collection management system 220 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 220 may also be responsible for publishing an icon that provides notification of a particular collection to the user interface of the interaction client 104. The collection management system 220 includes a curation function that allows a collection manager to manage and curate a particular collection of content. For example, the curation interface enables an event organizer to curate a collection of content relating to a specific event (e.g., to delete inappropriate content or redundant messages). Additionally, the collection management system 220 employs machine vision (or image recognition technology) and content rules to curate a content collection automatically. In certain examples, compensation may be paid to a user to include user-generated content into a collection. In such cases, the collection management system 220 operates to automatically make payments to such users to use their content.

A map system 222 provides various geographic location (e.g., geolocation) functions and supports the presentation of map-based media content and messages by the interaction client 104. For example, the map system 222 enables the display of user icons or avatars (e.g., stored in profile data 302 of FIG. 3) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 224 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 226 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes APIs with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A bridge script running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a graphical user interface (GUI) of the interaction client 104 to access features of the web-based external resource, the interaction client 104 obtains the HTML5 file and instantiates the resources to access the features of the web-based external resource.

The interaction client 104 presents a GUI (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another GUI of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional (2D) avatars of users with or without different avatar characteristics). As another example, external resources that include small-scale versions of applications (e.g., web-based versions of applications) are provided with access to a second type of user data (e.g., payment information, 2D avatars of users, 3D avatars of users, and avatars with various avatar characteristics). Avatar characteristics include different ways to customize a look and feel of an avatar, such as different poses, facial features, clothing, and so forth.

An advertisement system 228 operationally enables the purchasing of advertisements by third parties for presentation to end-users via the interaction clients 104 and also handles the delivery and presentation of these advertisements.

An artificial intelligence and machine learning system 230 provides a variety of services to different subsystems within the interaction system 100. For example, the artificial intelligence and machine learning system 230 operates with the image processing system 202 and the camera system 204 to analyze images and extract information such as objects, text, or faces. This information can then be used by the image processing system 202 to enhance, filter, or manipulate images. The artificial intelligence and machine learning system 230 may be used by the augmentation system 206 to generate augmented content, extended reality experiences, and augmented reality experiences, such as adding virtual objects or animations to real-world images. The communication system 208 and messaging system 210 may use the artificial intelligence and machine learning system 230 to analyze communication patterns and provide insights into how users interact with each other and provide intelligent message classification and tagging, such as categorizing messages based on sentiment or topic. The artificial intelligence and machine learning system 230 may also provide chatbot functionality to message interactions 120 between user systems 102 and between a user system 102 and the interaction server system 110. The artificial intelligence and machine learning system 230 may also work with the audio communication system 216 to provide speech recognition and natural language processing capabilities, allowing users to interact with the interaction system 100 using voice commands.

Data Architecture

Figure 3:
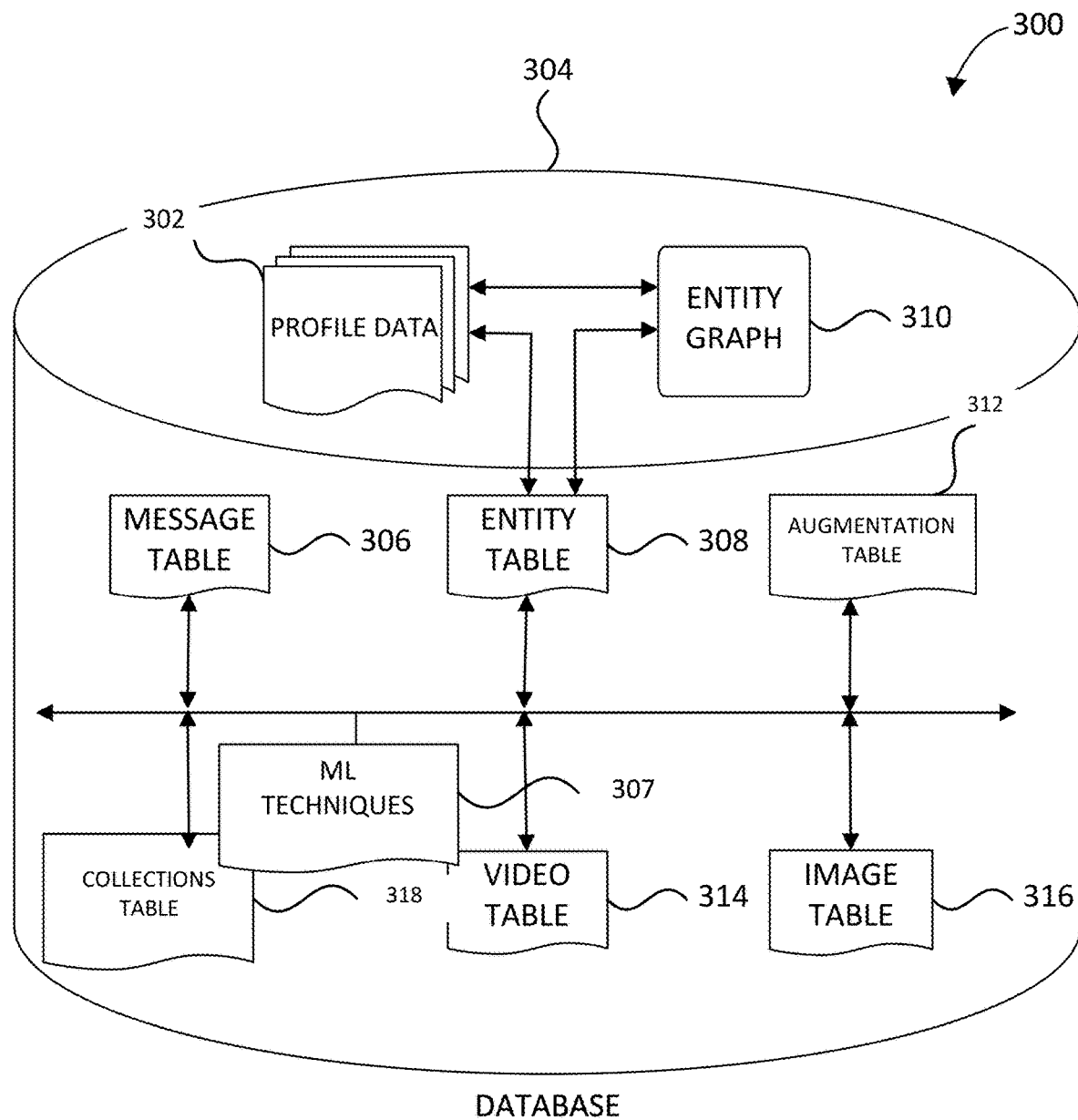
FIG. 3 is a diagrammatic representation of a data structure as maintained in a database, according to some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message, and included within the message data stored in the message table 306, are described below with reference to FIG. 4.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 308. Such privacy settings may be applied to all types of relationships within the context of the interaction system 100, or may selectively be applied to certain types of relationships.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a username, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

A collections table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

The databases 304 also include trained machine learning technique(s) 307 that stores parameters of one or more machine learning models that have been trained during training of the private identifier function system 500. For example, trained machine learning techniques 307 stores the trained parameters of one or more artificial neural network machine learning models or techniques.

Data Communications Architecture

Figure 4:
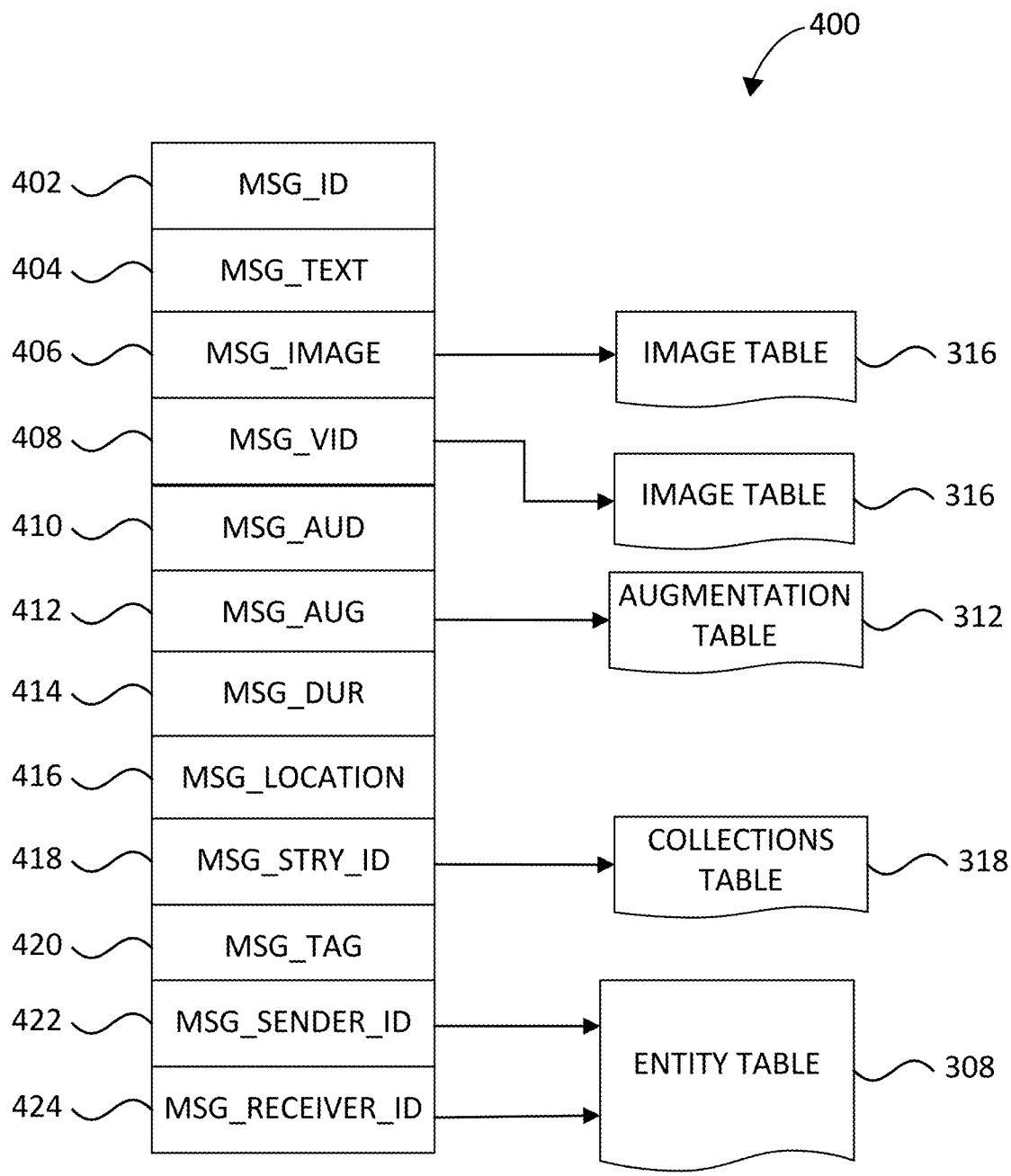
FIG. 4 is a diagrammatic representation of a message, according to some examples.

FIG. 4 is a schematic diagram illustrating a structure of a message 400, according to some examples, generated by an interaction client 104 for communication to a further interaction client 104 via the interaction servers 124. The content of a particular message 400 is used to populate the message table 306 stored within the database 304, accessible by the interaction servers 124. Similarly, the content of a message 400 is stored in memory as "in-transit" or "in-flight" data of the user system 102 or the interaction servers 124. A message 400 is shown to include the following example components:

Message identifier 402: a unique identifier that identifies the message 400.

Message text payload 404: text, to be generated by a user via a user interface of the user system 102, and that is included in the message 400.

Message image payload 406: image data, captured by a camera component of a user system 102 or retrieved from a memory component of a user system 102, and that is included in the message 400. Image data for a sent or received message 400 may be stored in the image table 316.

Message video payload 408: video data, captured by a camera component or retrieved from a memory component of the user system 102, and that is included in the message 400. Video data for a sent or received message 400 may be stored in the image table 316.

Message audio payload 410: audio data, captured by a microphone or retrieved from a memory component of the user system 102, and that is included in the message 400.

Message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 312.

Message duration parameter 414: parameter value indicating, in seconds, the amount of time for which content of the message (e.g., the message image payload 406, message video payload 408, message audio payload 410) is to be presented or made accessible to a user via the interaction client 104.

Message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

Message story identifier 418: identifier values identifying one or more content collections (e.g., "stories" identified in the collections table 318) with which a particular content item in the message image payload 406 of the message 400 is associated. For example, multiple images within the message image payload 406 may each be associated with multiple content collections using identifier values.

Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

Message sender identifier 422: an identifier (e.g., a messaging system identifier, email address, or device identifier) indicative of a user of the user system 102 on which the message 400 was generated and from which the message 400 was sent.

Message receiver identifier 424: an identifier (e.g., a messaging system identifier, email address, or device identifier) indicative of a user of the user system 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within an image table 316, values stored within the message augmentation data 412 may point to data stored in an augmentation table 312, values stored within the message story identifier 418 may point to data stored in a collections table 318, and values stored within the message sender identifier 422 and the message receiver identifier 424 may point to user records stored within an entity table 308.

Private Identifier Function System

Figure 5:
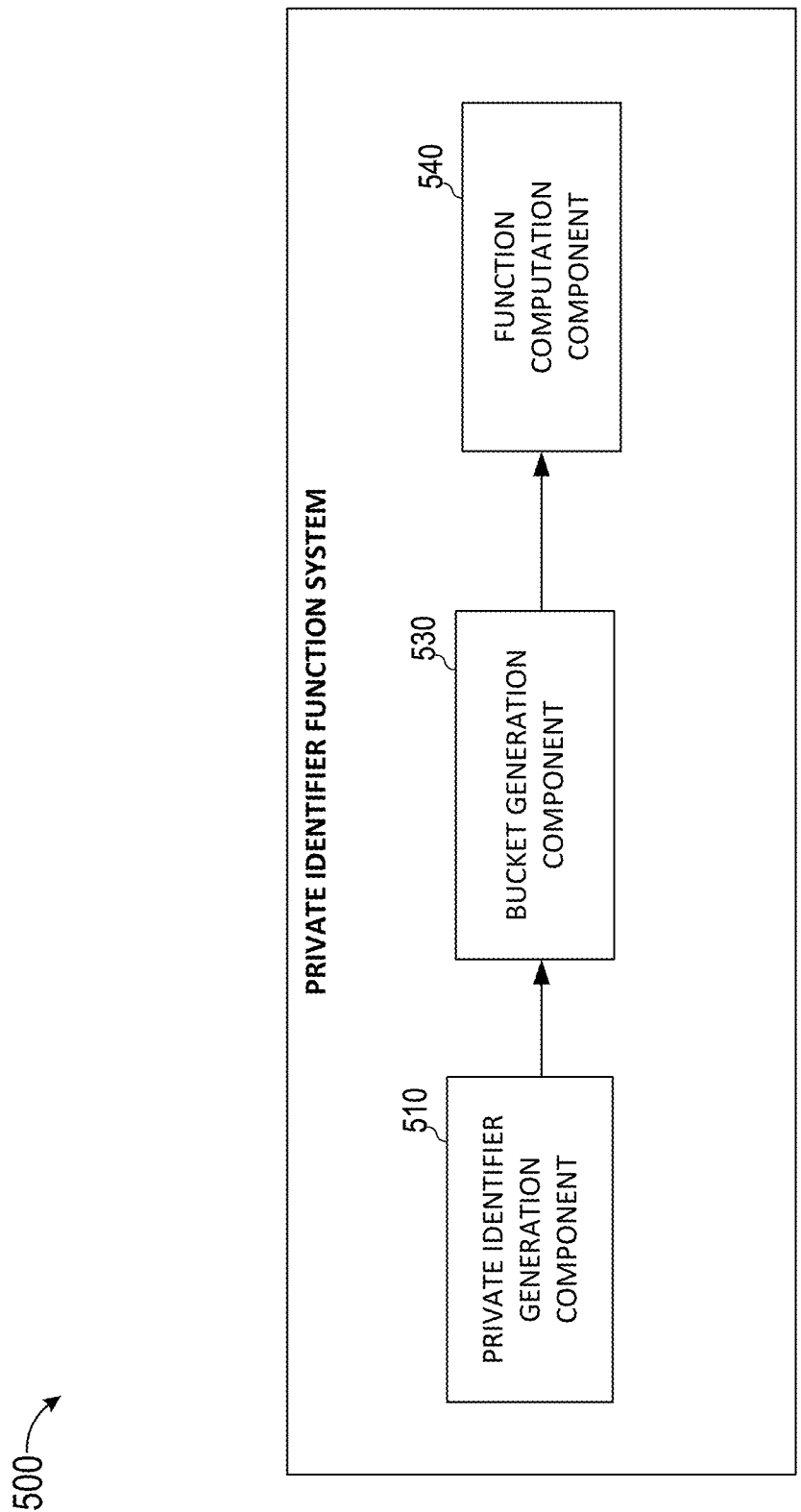
FIG. 5 is a diagrammatic representation of private identifier function system, in accordance with some examples.

FIG. 5 is a block diagram showing an example private identifier function system 500, according to some examples. The private identifier function system 500 can include a private identifier generation component 510, a bucket generation component 530, and/or a function computation component 540. The general operation of the private identifier function system 500 is first discussed in connection with operating on private data maintained by different entities (e.g., first and second entities) in a privacy preserving manner, such as using a portion of the MPC protocol. This generation operation is followed by the specific operation of each of these components of the private identifier function system 500.

The private identifier function system 500 stores, by a first entity (e.g., a provider of the interaction client 104), a first set of private identifiers associated with a first set of data. The private identifier function system 500 groups, by the first entity, different subsets of the first set of private identifiers into respective buckets of a first plurality of buckets according to a grouping criterion. The private identifier function system 500 applies a function to a subset of a second set of data, stored by a second entity (e.g., a provider of a third-party application and/or advertisement system), corresponding to private identifiers associated with one or more buckets of a second plurality of buckets, grouped by the second entity, that match private identifiers associated with one or more buckets of the first plurality of buckets. The private identifier function system 500 provides, to the first entity, a result of applying the function to the subset of the second set of data. In this way, the number of computations that need to be performed by the MPC protocol each time a function is requested to be computed is reduced, which improves the overall efficiencies of the system. This results in computation of functions in a private manner faster and more efficiently, which preserves and reduces the number of resources needed to accomplish a task.

In some examples, the private identifier function system 500 causes the second entity to store a second set of private identifiers associated with the second set of data. The private identifier function system 500 causes the second entity to group different subsets of the second set of private identifiers into respective buckets of the second plurality of buckets according to the grouping criterion. In some examples, the grouping criterion includes an identical sequential set of one or more characters in a private identifier.

In some examples, the first set of private identifiers corresponds to a first set of users associated with the first entity and the second set of private identifiers corresponds to a second set of users associated with the second entity. In some examples, a first user is common to both the first set of users and the second set of users, and a first private identifier of the first set of private identifiers corresponding to the first user matches a second private identifier of the second set of private identifiers corresponding to the first user. In some examples, the first user is excluded from the second set of users. In such cases, a first private identifier of the first set of private identifiers corresponding to the first user is different from each of the private identifiers in the second set of private identifiers. A second user can be excluded from the first set of users. In such cases, a second private identifier of the second set of private identifiers corresponding to the second user is different from each of the private identifiers in the first set of private identifiers.

In some examples, the result is computed as the function of private information including the subset of the second set of data without revealing the private information to the first entity. In some examples, the function includes an aggregation of the subset of the second set of data. In some examples, the function includes a secure MPC protocol function.

In some examples, the private identifier function system 500 searches the first set of private identifiers to identify a first group of private identifiers having a first set of sequential characters that are identical. The private identifier function system 500 assigns the first group of private identifiers to a first bucket of the first plurality of buckets. The private identifier function system 500 searches the first set of private identifiers to identify a second group of private identifiers having a second set of sequential characters that are identical and assigns the second group of private identifiers to a second bucket of the first plurality of buckets.

In some examples, the private identifier function system 500 searches the second set of private identifiers to identify a third group of private identifiers having the first set of sequential characters that are identical. The private identifier function system 500 assigns the third group of private identifiers to a third bucket of the second plurality of buckets. The private identifier function system 500 searches the second set of private identifiers to identify a fourth group of private identifiers having a third set of sequential characters that are identical and assigns the fourth group of private identifiers to a fourth bucket of the second plurality of buckets.

In some examples, the private identifier function system 500 selects, by the first entity, a group of users and identifies a subset of private identifiers of the first set of private identifiers associated with the group of users. The private identifier function system 500 identifies a first collection of buckets of the first plurality of buckets that includes the subset of the private identifiers associated with the group of users. In some examples, the private identifier function system 500 identifies a second collection of buckets of the second plurality of buckets that corresponds to the first collection of buckets and selects a group of common buckets of the first plurality of buckets corresponding to the identified second collection of buckets. The group of common buckets can represent buckets that are common to both the first entity and the second entity.

In some examples, the private identifier function system 500 generates a first table that includes the private identifiers associated with the group of common buckets of the first plurality of buckets and generates a second table that includes the private identifiers associated with the second collection of buckets and corresponding portions of the second set of data. In some examples, the private identifier function system 500 identifies a portion of private identifiers in the second table that matches private identifiers in the first table and applies the function to the corresponding portions of the second set of data associated with the identified portion of the private identifiers, such as in accordance with or using the MPC protocol.

In some examples, the private identifier function system 500 encrypts, using a first encryption key, a first set of user identifiers stored by the first entity to generate a first encrypted version of the first set of user identifiers. The private identifier function system 500 provides the first encrypted version of the first set of user identifiers to the second entity and encrypts, using second and third encryption keys, the first encrypted version of the first set of user identifiers to generate a second encrypted version of the first set of user identifiers. The private identifier function system 500 encrypts, using a fourth encryption key, the second encrypted version of the first set of user identifiers to generate the first set of private identifiers. In some examples, the private identifier function system 500 shuffles, according to a shuffling pattern, the first set of user identifiers prior to encrypting using the first encryption key. In some examples, the private identifier function system 500 unshuffles the second encrypted version of the first set of user identifiers using the shuffling pattern to associate the first set of private identifiers with the first set of user identifiers.

Referring now to the individual components of FIG. 5, the operation of each individual component—private identifier generation component 510, bucket generation component 530, and function computation component 540—is discussed.

The private identifier generation component 510 employs a process that generates unique and private identifiers for individual users of first and second entities. These private identifiers are unique to the first and second entities. For any given user identifier that is common to both the first and second entities, the given user is assigned an identical private identifier. In some cases, the first entity may need to perform a function using data of a third entity that is unassociated with the second entity. In such cases, the first entity may employ the private identifier generation component 510 to generate another collection of private identifiers that can be used to perform a function of the private data maintained by the third entity.

Namely, the first entity can store a first collection of private identifiers. This first collection of private identifiers can be associated with a second entity and can be unique to the second entity. The first collection of private identifiers can be generated together with the second entity and are used by the MPC framework to compute a function of private data maintained by the second entity. A first user identifier of a plurality of users of the first entity can be associated with a first private identifier that matches the private identifier for the same user identifier maintained by the second entity. The first entity can store a second collection of private identifiers that are associated with the third entity. The second collection of private identifiers can be generated together with the third entity and are used by the MPC framework to compute a function of private data maintained by the third entity. The first user identifier of the plurality of users of the first entity can be associated with a second private identifier that matches the private identifier for the same user identifier maintained by the third entity. In this way, the same user identifier can have multiple private identifiers each associated with a different entity, which the first entity can provide to the MPC framework to compute a function privately based on the data maintained by the respective entity.

Figure 6:
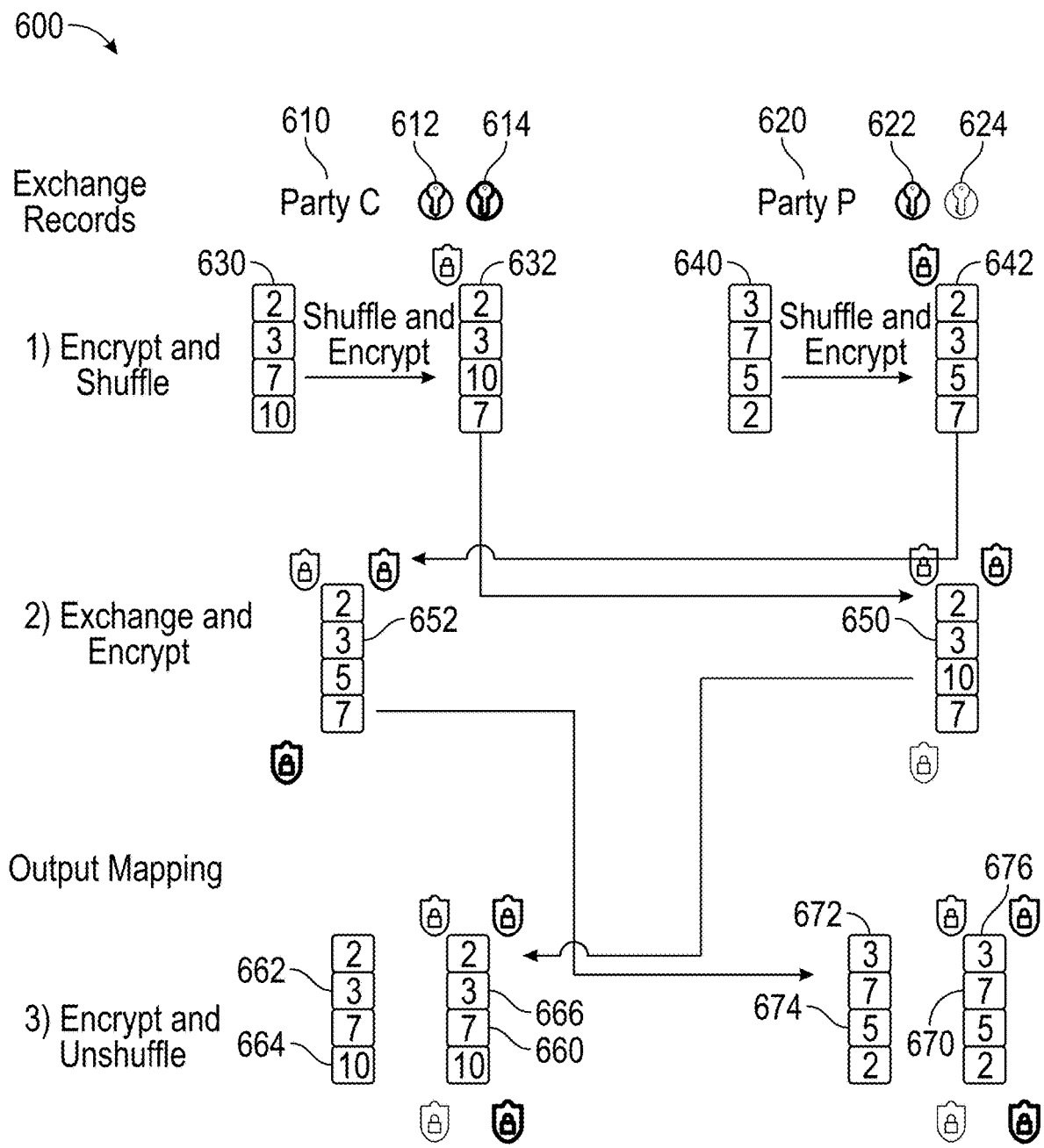
FIGS. 6-8 are detailed examples illustrating the operation of the private identifier function system, in accordance with some examples.

The private identifier generation component 510 can perform a set of operations 600 shown in FIG. 6 to generate and store the private identifiers for the first and second entities. Specifically, as shown in FIG. 6, a first entity 610 (e.g., party C) can store a first encryption key 612 and a second encryption key 614. A second entity 620 (e.g., party P) can store a third encryption key 622 and a fourth encryption key 624. The first entity 610 can manage or be associated with a first set of user identifiers 630 (e.g., corresponding to a first set of users). Each user identifier in the first set of user identifiers 630 can be associated with a first set of private data or private information, such as phone numbers, email addresses, activity performed by a user on an application associated with the first entity 610, and so forth. The second entity 620 can manage or be associated with a second set of user identifiers 640 (e.g., corresponding to a second set of users). Each user identifier in the second set of user identifiers 640 can be associated with a second set of private data or private information, such as phone numbers, advertisement consumption information, purchase information, affiliation information, activity performed by a user on an application associated with the second entity 620, and so forth.

Some or all of the users of the first entity 610 can match some or all of the users of the second entity 620. Namely, one or more user identifiers of the first set of user identifiers 630 can match one or more user identifiers of the second set of user identifiers 640 because the same user can be associated with both the first entity 610 and the second entity 620. One or more user identifiers of the first set of user identifiers 630 can differ from one or more user identifiers of the second set of user identifiers 640 because the first entity 610 can have a different set of users than the second entity 620, where a user of the first entity 610 may not be a user of the second entity 620. The first entity 610 and the second entity 620 may lack any knowledge about the overlap or commonality of user identifiers.

In some examples, the first entity 610 shuffles the first set of user identifiers 630 according to a shuffling pattern to generate shuffled data. The first entity 610 then encrypts the shuffled data using the first encryption key 612 to generate a first set of encrypted data 632. Similarly, the second entity 620 shuffles the second set of user identifiers 640 according to a shuffling pattern (which may be the same as or different from the shuffling pattern employed by the first entity 610 to shuffle the first set of user identifiers 630) to generate shuffled data. The second entity 620 then encrypts the shuffled data using the third encryption key 622 to generate a second set of encrypted data 642.

The first entity 610 sends the first set of encrypted data 632 to the second entity 620 and the second entity 620 sends the second set of encrypted data 642 to the first entity 610. The second entity 620, in response to receiving the first set of encrypted data 632, encrypts the first set of encrypted data 632 using the third encryption key 622 and the fourth encryption key 624 to generate a third set of encrypted data 652. Similarly, the first entity 610, in response to receiving the second set of encrypted data 642, encrypts the second set of encrypted data 642 using the first encryption key 612 and the second encryption key 614 to generate a fourth set of encrypted data 650. The first entity 610 sends the third set of encrypted data 652 to the second entity 620. The second entity 620 sends the fourth set of encrypted data 650 to the first entity 610.

The first entity 610 encrypts the fourth set of encrypted data 650 using the second encryption key 614 to generate a shuffled set of private identifiers. The first entity 610 then applies the shuffling pattern (used by the first entity 610 to initially shuffle the first set of user identifiers 630) to the shuffled set of private identifiers to unshuffle the private identifiers. This unshuffled set of private identifiers 660 can be matched or associated with the corresponding first set of user identifiers 630. In this way, a first user identifier 662 can be matched or associated with a first private identifier 666 in the unshuffled set of private identifiers 660 and a second user identifier 664 can be matched or associated with a second private identifier in the unshuffled set of private identifiers 660. Similarly, the second entity 620 encrypts the third set of encrypted data 652 using the fourth encryption key 624 to generate a shuffled set of private identifiers. The second entity 620 then applies the shuffling pattern (used by the second entity 620 to initially shuffle the second set of user identifiers 640) to the shuffled set of private identifiers to unshuffle the private identifiers. This unshuffled set of private identifiers 670 can be matched or associated with the corresponding second set of user identifiers 640. In this way, a third user identifier 672 can be matched or associated with a third private identifier 676 and a fourth user identifier 674 can be matched or associated with a fourth private identifier in the unshuffled set of private identifiers 670. The first entity 610 can store the unshuffled set of private identifiers 660 in association with the second entity 620 and in association with the first set of user identifiers 630. Similarly, the second entity 620 can store the unshuffled set of private identifiers 670 in association with the first entity 610 and in association with the second set of user identifiers 640.

Referring back to FIG. 5, the bucket generation component 530 can bucketize the private identifiers of the first and second entities. Namely, the bucket generation component 530 can generate buckets that include different subsets of the private identifiers according to a grouping criterion. The first and second entities can share the grouping criterion and can each independently generate the buckets that include their respectively stored private identifiers.

Figure 7:
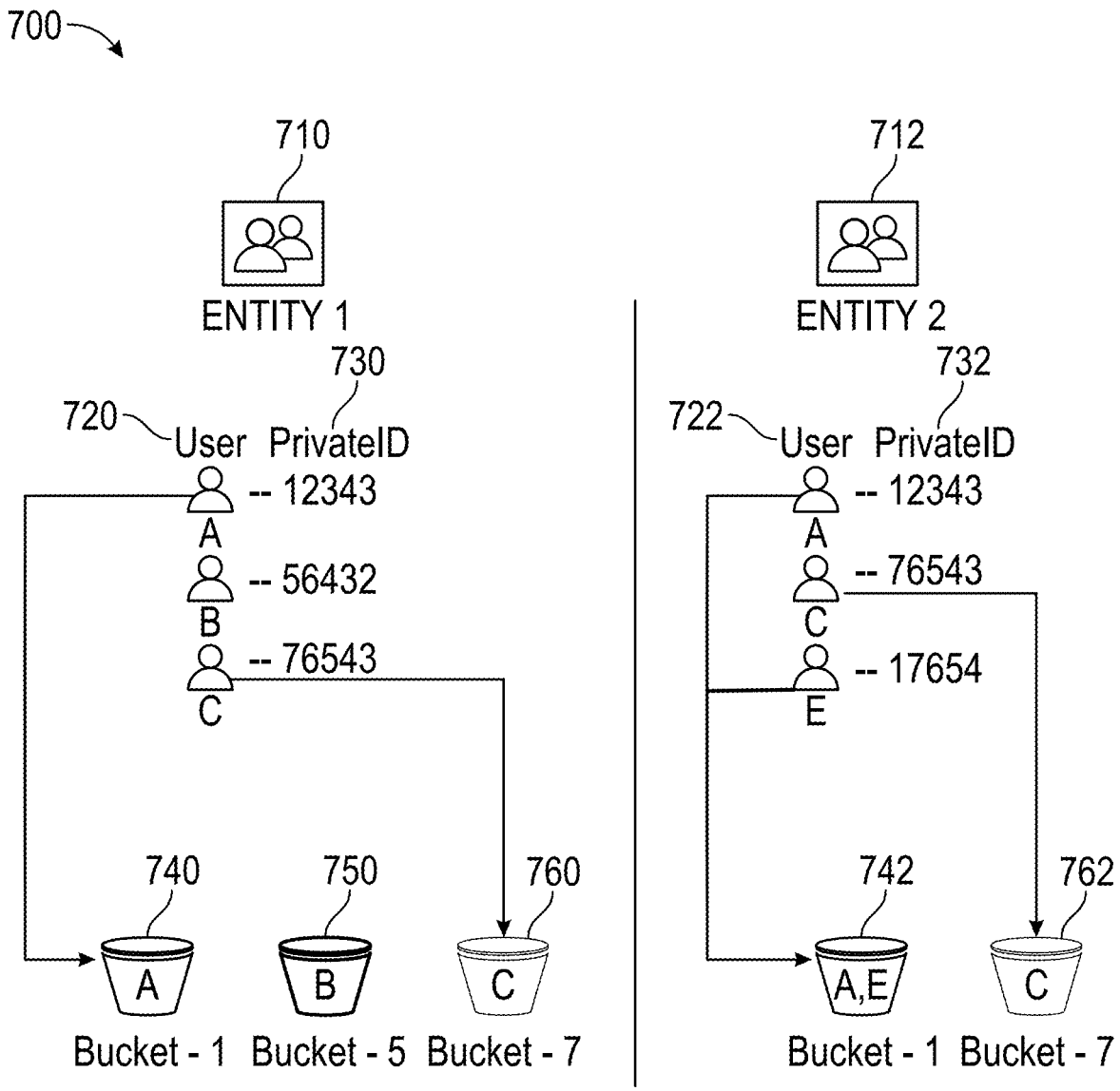

For example, as shown in the set of bucketizing operations 700 shown in FIG. 7, the first entity 710 (which can correspond to or be the same as the first entity 610), can access a first set of private identifiers 730 (e.g., corresponding to the unshuffled set of private identifiers 660) that are associated with a first set of user identifiers 720 (e.g., corresponding to the first set of user identifiers 630). The first entity 710 can obtain or agree with a second entity 712 (which can correspond to or be the same as the second entity 620) on a grouping criterion. The grouping criterion can be any logic function that can be applied to private identifiers to group or select a subset of the private identifiers. In some examples, the grouping criterion is a sequence of adjacent numbers or digits, such as the first digit or the last digit of the private identifier. For example, if one private identifier is 12343 and another private identifier is 15533, the grouping criterion can group both of these identifiers into the same bucket because both private identifiers have an identical first digit (e.g., '1'). As an example, the first entity 710 assigns a first private identifier (or a first subset of the first set of private identifiers 730) to a first bucket 740 based on the grouping criterion and generates a label for the first bucket 740 based on the grouping criterion. For example, the first entity 710 assigns the digit(s) that are common to all of the private identifiers included in the first bucket 740 to the label of the first bucket 740. The first entity 710 assigns a second private identifier (or a second subset of the first set of private identifiers 730) to a second bucket 750 based on the grouping criterion and generates a label for the second bucket 750 based on the grouping criterion. The first entity 710 assigns a third private identifier (or a third subset of the first set of private identifiers 730) to a third bucket 760 based on the grouping criterion and generates a label for the second bucket 750 based on the grouping criterion.

Similarly, the second entity 712 assigns a fourth private identifier (or a first subset of a second set of private identifiers 732) to a fourth bucket 742 based on the grouping criterion and generates a label for the fourth bucket 742 based on the grouping criterion. The second set of private identifiers 732 can correspond to the unshuffled set of private identifiers 670 and can correspond to the user identifiers 722 (e.g., the second set of user identifiers 640) of the second entity 712. For example, the second entity 712 assigns the digit(s) that are common to all of the private identifiers included in the fourth bucket 742 to the label of the fourth bucket 742. The second entity 712 assigns a fifth private identifier (or a second subset of the second set of private identifiers 732) to a fifth bucket 762 based on the grouping criterion and generates a label for the fifth bucket 762 based on the grouping criterion. Some of the buckets of the first entity 710 can match the buckets of the second entity 712 while others may not match. The buckets that match between the first entity 710 and the second entity 712 can have identical labels. Namely, because the labels are generated based on the grouping criterion and can include a sequence of digits, such as the first digit, of private identifiers associated with the respective buckets, the labels for two different buckets stored by the first entity 710 and the second entity 712 can match.

As an example, the label for the first bucket 740 can be the first digit of each private identifier included in the first bucket 740. In one example, this first digit can be the number '1'. Similarly, the label for the fourth bucket 742 can be the first digit of each private identifier included in the fourth bucket 742. In one example, this first digit can also be the number '1' because both buckets were generated using the same grouping criterion. This allows the first entity 710 and the second entity 712 to determine buckets of private identifiers that are common to both entities without revealing the contents of the private identifiers.

Figure 8:
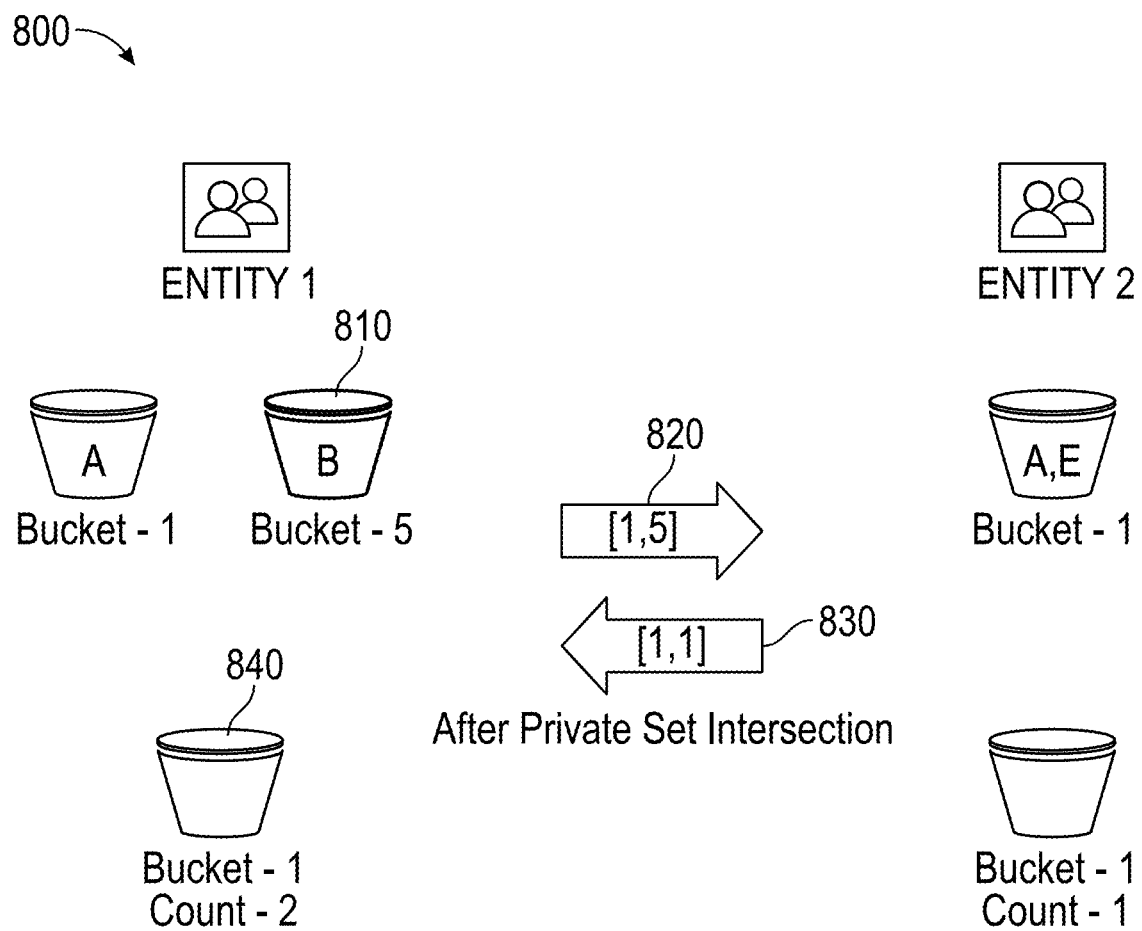

In an example, after the buckets are generated, the bucket generation component 530 can select some or all of the buckets for computing a desired MPC function. For example, the first entity can select a group of user identifiers for which a function needs to be computed based on private information maintained for such group of user identifiers by the second entity. The first entity can identify the private identifiers associated with the selected group of user identifiers and can then access the group criterion to identify which subset of buckets include the identified private identifiers of the selected group of user identifiers. For example, as shown in the diagram 800 of FIG. 8, the first entity 710 can select or identify a first set of buckets 810 that include a first bucket with a first label (e.g., '1') and a second bucket with a second label (e.g., '5'). The first entity 710 can send a communication 820 to the second entity 712 that includes the first and second labels. The second entity 712 can then search the labels of the buckets stored by the second entity 712 to determine whether any of the labels match the first and second labels. In some examples, the second entity 712 can determine that a third bucket has a label that matches the first label received in the communication 820 and that none of the other buckets have labels that match the second label.

In such cases, the second entity 712 transmits a communication 830 back to the first entity 710 that indicates the matching bucket labels (e.g., label '1') and the quantity of private identifiers included the bucket. In response, the first entity 710 can determine that none of the users with user identifiers associated with private identifiers included in the second bucket have accounts or corresponding user identifiers in the second entity 712. Namely, the first entity 710 can determine that none of the user identifiers in the first set of user identifiers 630 maintained by the first entity 710 which have private identifiers included in the second bucket match any user identifiers in the second set of user identifiers 640. In response, the first entity 710 can select only the first bucket 840 to use to provide private identifiers to the MPC function and can exclude any private identifier that is in the second bucket. This reduces the overall number of operations that the MPC framework needs to perform and improves the overall efficiency and speed at which results are generated by the MPC framework.

In some examples, the first entity 710 can generate a first table that includes a list of the private identifiers in the first bucket 840. The first entity 710 can duplicate one or more private identifiers in the table if the quantity of private identifiers in the first bucket 840 is less than the quantity of private identifiers specified in the communication 830 for the first bucket. The table can also include private information associated with the private information that is maintained by the first entity 710. Similarly, the second entity 712 can generate a second table that includes a list of the private identifiers in the third bucket along with private information associated with the list of private identifiers.

The function computation component 540 allows the first entity 710 to call an MPC function using the first table with a request to perform an operation using a combination of the private identifiers and private information contained in the first table. Namely, the function computation component 540 can store or provide access to the MPC framework for allowing first and second entities to compute functions of their private data privately without revealing contents of the private information.

In some cases, the MPC function can access the second table securely and privately from the second entity 712. The MPC function identifies an intersection between the private identifiers in the first table with those in the second table. For example, the MPC function can determine that a first private identifier in the first table matches a second private identifier in the second table. In response, the MPC function evaluates whether one or more conditions are met by the private information in the first table associated with the first private identifier (e.g., whether a timestamp for the first private identifier is less than a threshold value). If the one or more conditions are met or satisfied, the MPC function accesses private information from the second table associated with the second private identifier and performs a requested operation, such as aggregation, subtraction, modulo operation, or other operation, on the private information. The MPC function stores or aggregates this operation into a result. The MPC function continues performing this sequence of operations until all of the private identifiers have been processed and compared. If a private identifier in the first table fails to match any private identifier in the second table, the MPC function skips operations for such a private identifier. The MPC function then returns the result that includes the requested operation, such as aggregation, subtraction, modulo operation, or other operation, on the private information stored in the second table to the first entity 710.

Figure 9:
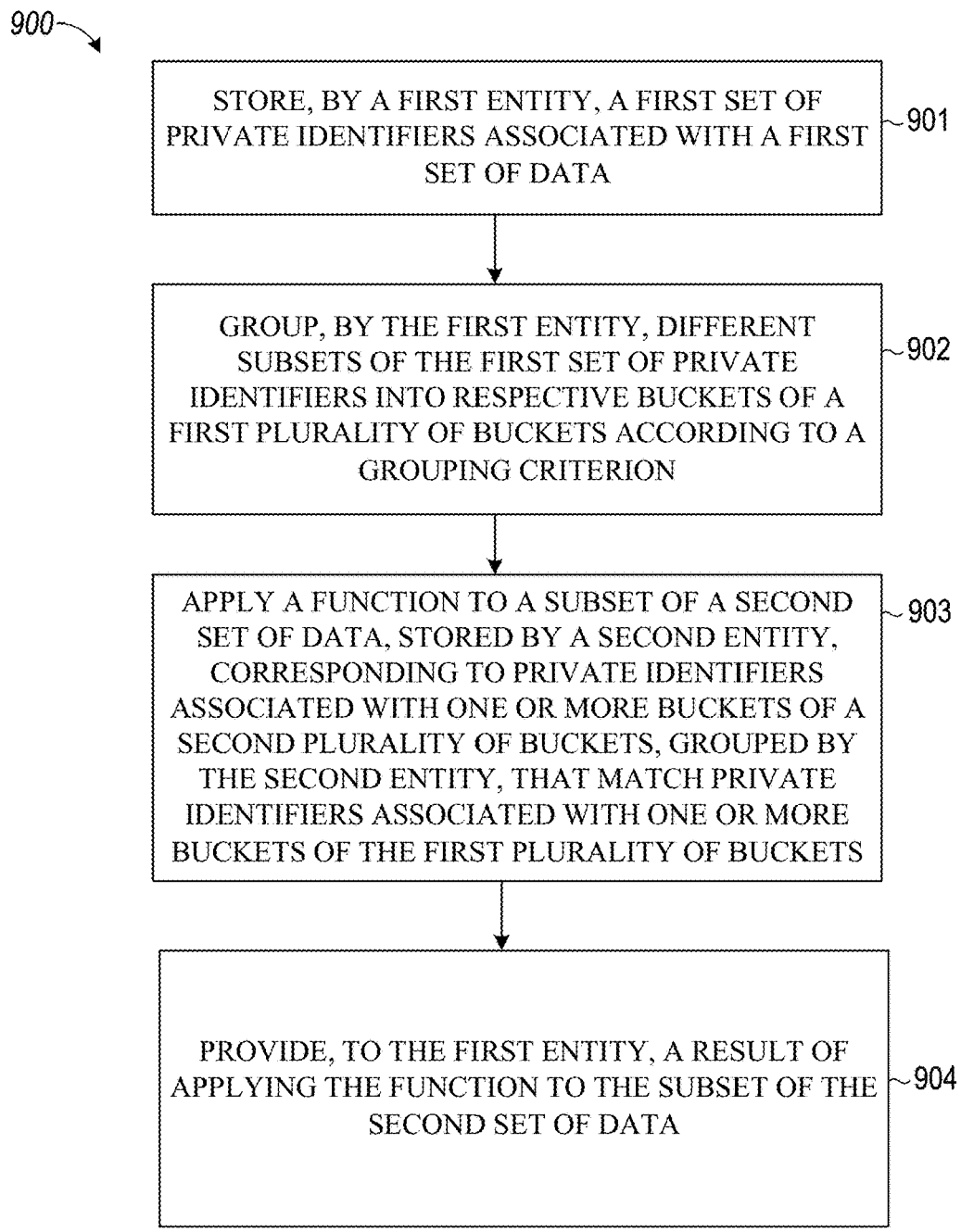
FIG. 9 is a flowchart illustrating example operations and a method of the private identifier function system, in accordance with some examples.

For example, the FIG. 9 is a flowchart of a process 900 performed by the private identifier function system 500, in accordance with some examples. Although the flowchart can describe the operations as a sequential process, many of the operations can be performed in parallel or concurrently. In addition, the order of the operations may be re-arranged. A process is terminated when its operations are completed. A process may correspond to a method, a procedure, and the like. The steps of methods may be performed in whole or in part, may be performed in conjunction with some or all of the steps in other methods, and may be performed by any number of different systems or any portion thereof, such as a processor included in any of the systems.

At operation 901, the private identifier function system 500 (e.g., a user system 102 or a server) stores, by a first entity, a first set of private identifiers associated with a first set of data, as discussed above.

At operation 902, the private identifier function system 500 groups, by the first entity, different subsets of the first set of private identifiers into respective buckets of a first plurality of buckets according to a grouping criterion, as discussed above.

At operation 903, the private identifier function system 500 applies a function to a subset of a second set of data, stored by a second entity, corresponding to private identifiers associated with one or more buckets of a second plurality of buckets, grouped by the second entity, that match private identifiers associated with one or more buckets of the first plurality of buckets, as discussed above.

At operation 904, the private identifier function system 500 provides, to the first entity, a result of applying the function to the subset of the second set of data, as discussed above.

Examples

Example 1. A method comprising: storing, by a first entity, a first set of private identifiers associated with a first set of data; grouping, by the first entity, different subsets of the first set of private identifiers into respective buckets of a first plurality of buckets according to a grouping criterion; applying a function to a subset of a second set of data, stored by a second entity, corresponding to private identifiers associated with one or more buckets of a second plurality of buckets, grouped by the second entity, that match private identifiers associated with one or more buckets of the first plurality of buckets; and providing, to the first entity, a result of applying the function to the subset of the second set of data.

Example 2. The method of Example 1, further comprising: causing the second entity to store a second set of private identifiers associated with the second set of data; and causing the second entity to group different subsets of the second set of private identifiers into respective buckets of the second plurality of buckets according to the grouping criterion.

Example 3. The method of Example 2, wherein the first set of private identifiers corresponds to a first set of users associated with the first entity, and wherein the second set of private identifiers corresponds to a second set of users associated with the second entity.

Example 4. The method of Example 3, wherein a first user is common to both the first set of users and the second set of users, and wherein a first private identifier of the first set of private identifiers corresponding to the first user matches a second private identifier of the second set of private identifiers corresponding to the first user.

Example 5. The method of any one of Examples 3-4, wherein a first user is excluded from the second set of users, wherein a first private identifier of the first set of private identifiers corresponding to the first user is different from each of the private identifiers in the second set of private identifiers, wherein a second user is excluded from the first set of users, wherein a second private identifier of the second set of private identifiers corresponding to the second user is different from each of the private identifiers in the first set of private identifiers.

Example 6. The method of any one of Examples 1-5, wherein the result is computed as the function of private information comprising the subset of the second set of data without revealing the private information to the first entity.

Example 7. The method of any one of Examples 1-6, wherein the function comprises an aggregation of the subset of the second set of data.

Example 8. The method of any one of Examples 1-7, wherein the function comprises a secure MPC protocol function.

Example 9. The method of any one of Examples 1-8, wherein the grouping criterion comprises an identical sequential set of one or more characters in a private identifier.

Example 10. The method of Example 9, further comprising: searching the first set of private identifiers to identify a first group of private identifiers having a first set of sequential characters that are identical; assigning the first group of private identifiers to a first bucket of the first plurality of buckets; searching the first set of private identifiers to identify a second group of private identifiers having a second set of sequential characters that are identical; and assigning the second group of private identifiers to a second bucket of the first plurality of buckets.

Example 11. The method of Example 10, further comprising: searching the second set of private identifiers to identify a third group of private identifiers having the first set of sequential characters that are identical; assigning the third group of private identifiers to a third bucket of the second plurality of buckets; searching the second set of private identifiers to identify a fourth group of private identifiers having a third set of sequential characters that are identical; and assigning the fourth group of private identifiers to a fourth bucket of the second plurality of buckets.

Example 12. The method of any one of Examples 1-11, further comprising: selecting, by the first entity, a group of users; identifying a subset of private identifiers of the first set of private identifiers associated with the group of users; and identifying a first collection of buckets of the first plurality of buckets that includes the subset of the private identifiers associated with the group of users.

Example 13. The method of Example 12, further comprising: identifying a second collection of buckets of the second plurality of buckets that corresponds to the first collection of buckets; and selecting a group of common buckets of the first plurality of buckets corresponding to the identified second collection of buckets, the group of common buckets representing buckets that are common to both the first entity and the second entity.

Example 14. The method of Example 13, further comprising: generating a first table that includes the private identifiers associated with the group of common buckets of the first plurality of buckets; and generating a second table that includes the private identifiers associated with the second collection of buckets and corresponding portions of the second set of data.

Example 15. The method of Example 14, further comprising: identifying a portion of private identifiers in the second table that matches private identifiers in the first table; and applying the function to the corresponding portions of the second set of data associated with the identified portion of the private identifiers.

Example 16. The method of any one of Examples 1-15, further comprising: encrypting, using a first encryption key, a first set of user identifiers stored by the first entity to generate a first encrypted version of the first set of user identifiers; providing the first encrypted version of the first set of user identifiers to the second entity; encrypting, using second and third encryption keys, the first encrypted version of the first set of user identifiers to generate a second encrypted version of the first set of user identifiers; and encrypting, using a fourth encryption key, the second encrypted version of the first set of user identifiers to generate the first set of private identifiers.

Example 17. The method of Example 16, further comprising shuffling, according to a shuffling pattern, the first set of user identifiers prior to encrypting using the first encryption key.

Example 18. The method of Example 17, further comprising un-shuffling the second encrypted version of the first set of user identifiers using the shuffling pattern to associate the first set of private identifiers with the first set of user identifiers.

Example 19. A system comprising: at least one processor; and at least one memory component having instructions stored thereon that, when executed by the at least one processor, cause the at least one processor to perform operations comprising: storing, by a first entity, a first set of private identifiers associated with a first set of data; grouping, by the first entity, different subsets of the first set of private identifiers into respective buckets of a first plurality of buckets according to a grouping criterion; applying a function to a subset of a second set of data, stored by a second entity, corresponding to private identifiers associated with one or more buckets of a second plurality of buckets, grouped by the second entity, that match private identifiers associated with one or more buckets of the first plurality of buckets; and providing, to the first entity, a result of applying the function to the subset of the second set of data.

Example 20. A non-transitory computer-readable storage medium having stored thereon instructions that, when executed by at least one processor, cause the at least one processor to perform operations comprising: storing, by a first entity, a first set of private identifiers associated with a first set of data; grouping, by the first entity, different subsets of the first set of private identifiers into respective buckets of a first plurality of buckets according to a grouping criterion; applying a function to a subset of a second set of data, stored by a second entity, corresponding to private identifiers associated with one or more buckets of a second plurality of buckets, grouped by the second entity, that match private identifiers associated with one or more buckets of the first plurality of buckets; and providing, to the first entity, a result of applying the function to the subset of the second set of data.

Machine Architecture

Figure 10:
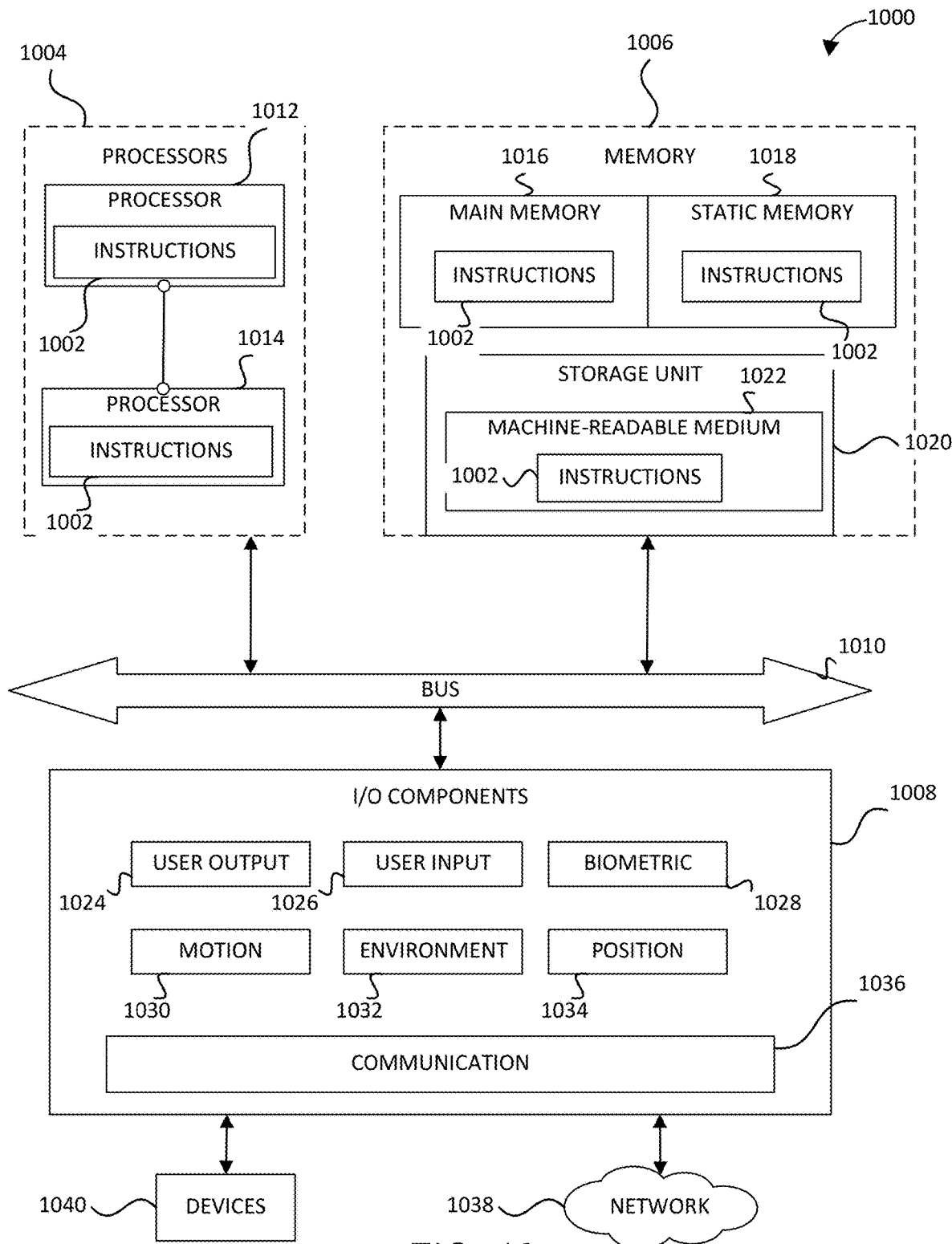
FIG. 10 is a diagrammatic representation of a machine in the form of a computer system within which a set of instructions may be executed to cause the machine to perform any one or more of the methodologies discussed herein, in accordance with some examples.

FIG. 10 is a diagrammatic representation of the machine 1000 within which instructions 1002 (e.g., software, a program, an application, an applet, an app, or other executable code) for causing the machine 1000 to perform any one or more of the methodologies discussed herein may be executed. For example, the instructions 1002 may cause the machine 1000 to execute any one or more of the methods described herein. The instructions 1002 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1002, sequentially or otherwise, that specify actions to be taken by the machine 1000. Further, while a single machine 1000 is illustrated, the term "machine" shall also be taken to include a collection of machines that individually or jointly execute the instructions 1002 to perform any one or more of the methodologies discussed herein. The machine 1000, for example, may comprise the user system 102 or any one of multiple server devices forming part of the interaction server system 110. In some examples, the machine 1000 may also comprise both client and server systems, with certain operations of a particular method or algorithm being performed on the server-side and with certain operations of the particular method or algorithm being performed on the client-side.

The machine 1000 may include processors 1004, memory 1006, and input/output (I/O) components 1008, which may be configured to communicate with each other via a bus 1010. In an example, the processors 1004 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1012 and a processor 1014 that execute the instructions 1002. The term "processor" is intended to include multi-core processors that may comprise two or more independent processors (sometimes referred to as "cores") that may execute instructions contemporaneously. Although FIG. 10 shows multiple processors 1004, the machine 1000 may include a single processor with a single-core, a single processor with multiple cores (e.g., a multi-core processor), multiple processors with a single core, multiple processors with multiples cores, or any combination thereof.

The memory 1006 includes a main memory 1016, a static memory 1018, and a storage unit 1020, both accessible to the processors 1004 via the bus 1010. The main memory 1006, the static memory 1018, and storage unit 1020 store the instructions 1002 embodying any one or more of the methodologies or functions described herein. The instructions 1002 may also reside, completely or partially, within the main memory 1016, within the static memory 1018, within machine-readable medium 1022 within the storage unit 1020, within at least one of the processors 1004 (e.g., within the processor's cache memory), or any suitable combination thereof, during execution thereof by the machine 1000.

The I/O components 1008 may include a wide variety of components to receive input, provide output, produce output, transmit information, exchange information, capture measurements, and so on. The specific I/O components 1008 that are included in a particular machine will depend on the type of machine. For example, portable machines such as mobile phones may include a touch input device or other such input mechanisms, while a headless server machine will likely not include such a touch input device. It will be appreciated that the I/O components 1008 may include many other components that are not shown in FIG. 10. In various examples, the I/O components 1008 may include user output components 1024 and user input components 1026. The user output components 1024 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like. Any biometric collected by the biometric components is captured and stored with user approval and deleted on user request.

Further, such biometric data may be used for very limited purposes, such as identification verification. To ensure limited and authorized use of biometric information and other personally identifiable information (PII), access to this data is restricted to authorized personnel only, if allowed at all. Any use of biometric data may strictly be limited to identification verification purposes, and the data is not shared or sold to any third party without the explicit consent of the user. In addition, appropriate technical and organizational measures are implemented to ensure the security and confidentiality of this sensitive information.

In further examples, the I/O components 1008 may include biometric components 1028, motion components 1030, environmental components 1032, or position components 1034, among a wide array of other components. For example, the biometric components 1028 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The biometric components may include a brain-machine interface (BMI) system that allows communication between the brain and an external device or machine. This may be achieved by recording brain activity data, translating this data into a format that can be understood by a computer, and then using the resulting signals to control the device or machine.

Example types of BMI technologies include:
Electroencephalography (EEG) based BMIs, which record electrical activity in the brain using electrodes placed on the scalp.
Invasive BMIs, which used electrodes that are surgically implanted into the brain.
Optogenetics BMIs, which use light to control the activity of specific nerve cells in the brain.

The motion components 1030 include acceleration sensor components (e.g., accelerometer), gravitation sensor components, and rotation sensor components (e.g., gyroscope).

The environmental components 1032 include, for example, one or more cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 1034 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1008 further include communication components 1036 operable to couple the machine 1000 to a network 1038 or devices 1040 via respective coupling or connections. For example, the communication components 1036 may include a network interface component or another suitable device to interface with the network 1038. In further examples, the communication components 1036 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1040 may be another machine or any of a wide variety of peripheral devices (e.g., a peripheral device coupled via a USB).

Moreover, the communication components 1036 may detect identifiers or include components operable to detect identifiers. For example, the communication components 1036 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1036, such as location via Internet Protocol (IP) geolocation, location via Wi-Fi® signal triangulation, location via detecting an NFC beacon signal that may indicate a particular location, and so forth.

The various memories (e.g., main memory 1016, static memory 1018, and memory of the processors 1004) and storage unit 1020 may store one or more sets of instructions and data structures (e.g., software) embodying or used by any one or more of the methodologies or functions described herein. These instructions (e.g., the instructions 1002), when executed by processors 1004, cause various operations to implement the disclosed examples.

The instructions 1002 may be transmitted or received over the network 1038, using a transmission medium, via a network interface device (e.g., a network interface component included in the communication components 1036) and using any one of several well-known transfer protocols (e.g., HTTP). Similarly, the instructions 1002 may be transmitted or received using a transmission medium via a coupling (e.g., a peer-to-peer coupling) to the devices 1040.

software ARCHITECTURE

Figure 11:
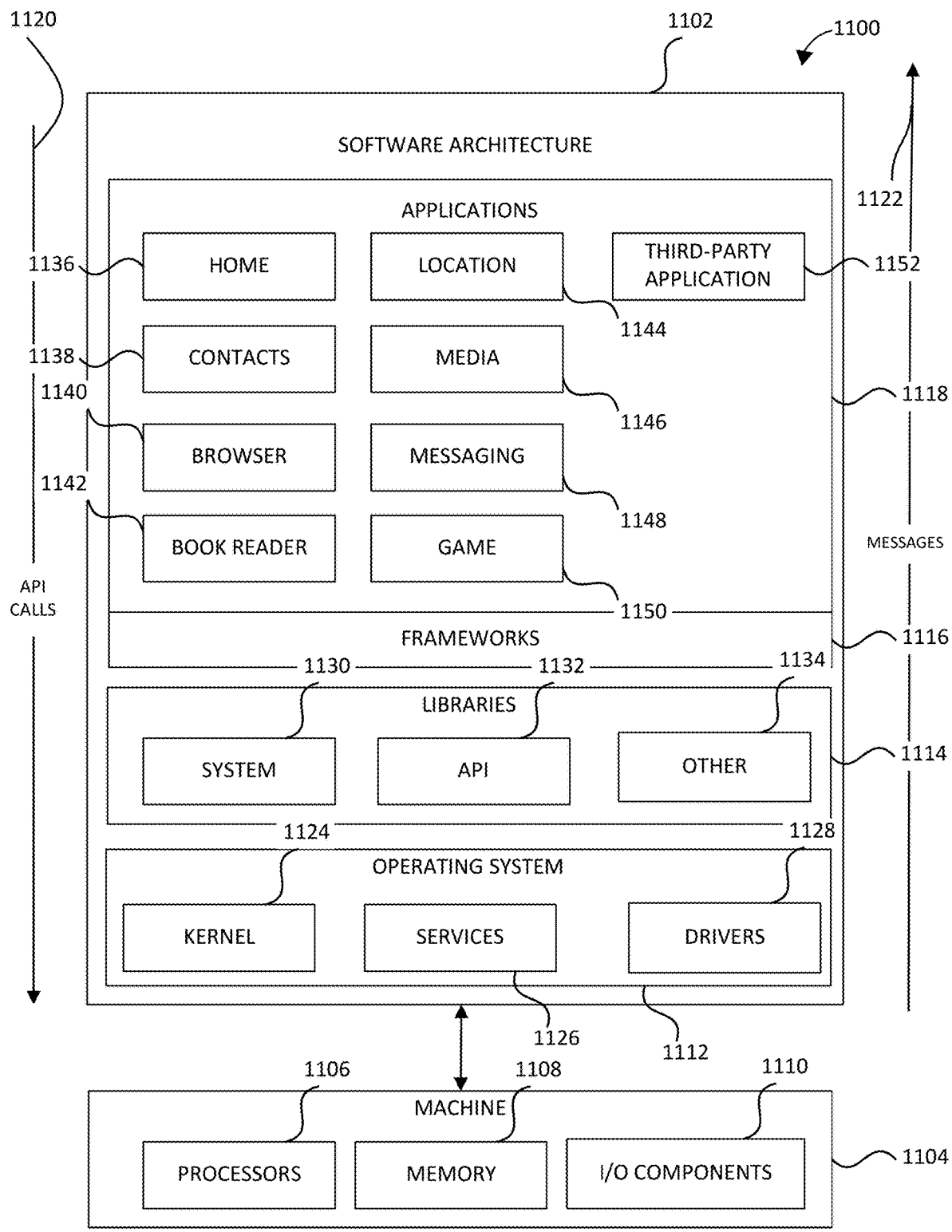
FIG. 11 is a block diagram showing a software architecture within which examples may be implemented.

FIG. 11 is a block diagram 1100 illustrating a software architecture 1102, which can be installed on any one or more of the devices described herein. The software architecture 1102 is supported by hardware such as a machine 1104 that includes processors 1106, memory 1108, and I/O components 1110. In this example, the software architecture 1102 can be conceptualized as a stack of layers, where each layer provides a particular functionality. The software architecture 1102 includes layers such as an operating system 1112, libraries 1114, frameworks 1116, and applications 1118. Operationally, the applications 1118 invoke API calls 1120 through the software stack and receive messages 1122 in response to the API calls 1120.

The operating system 1112 manages hardware resources and provides common services. The operating system 1112 includes, for example, a kernel 1124, services 1126, and drivers 1128. The kernel 1124 acts as an abstraction layer between the hardware and the other software layers. For example, the kernel 1124 provides memory management, processor management (e.g., scheduling), component management, networking, and security settings, among other functionalities. The services 1126 can provide other common services for the other software layers. The drivers 1128 are responsible for controlling or interfacing with the underlying hardware. For instance, the drivers 1128 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1114 provide a common low-level infrastructure used by the applications 1118. The libraries 1114 can include system libraries 1130 (e.g., C standard library) that provide functions such as memory allocation functions, string manipulation functions, mathematic functions, and the like. In addition, the libraries 1114 can include API libraries 1132 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic content on a display), database libraries (e.g., SQLite to provide various relational database functions), web libraries (e.g., WebKit to provide web browsing functionality), and the like. The libraries 1114 can also include a wide variety of other libraries 1134 to provide many other APIs to the applications 1118.

The frameworks 1116 provide a common high-level infrastructure that is used by the applications 1118. For example, the frameworks 1116 provide various GUI functions, high-level resource management, and high-level location services. The frameworks 1116 can provide a broad spectrum of other APIs that can be used by the applications 1118, some of which may be specific to a particular operating system or platform.

In an example, the applications 1118 may include a home application 1136, a contacts application 1138, a browser application 1140, a book reader application 1142, a location application 1144, a media application 1146, a messaging application 1148, a game application 1150, and a broad assortment of other applications such as a third-party application 1152. The applications 1118 are programs that execute functions defined in the programs. Various programming languages can be employed to create one or more of the applications 1118, structured in a variety of manners, such as object-oriented programming languages (e.g., Objective-C, Java, or C++) or procedural programming languages (e.g., C or assembly language). In a specific example, the third-party application 1152 (e.g., an application developed using the ANDROID™ or IOS™ SDK by an entity other than the vendor of the particular platform) may be mobile software running on a mobile operating system such as IOS™, ANDROID™, WINDOWS® Phone, or another mobile operating system. In this example, the third-party application 1152 can invoke the API calls 1120 provided by the operating system 1112 to facilitate functionalities described herein.

System with Head-Wearable Apparatus

Figure 12:
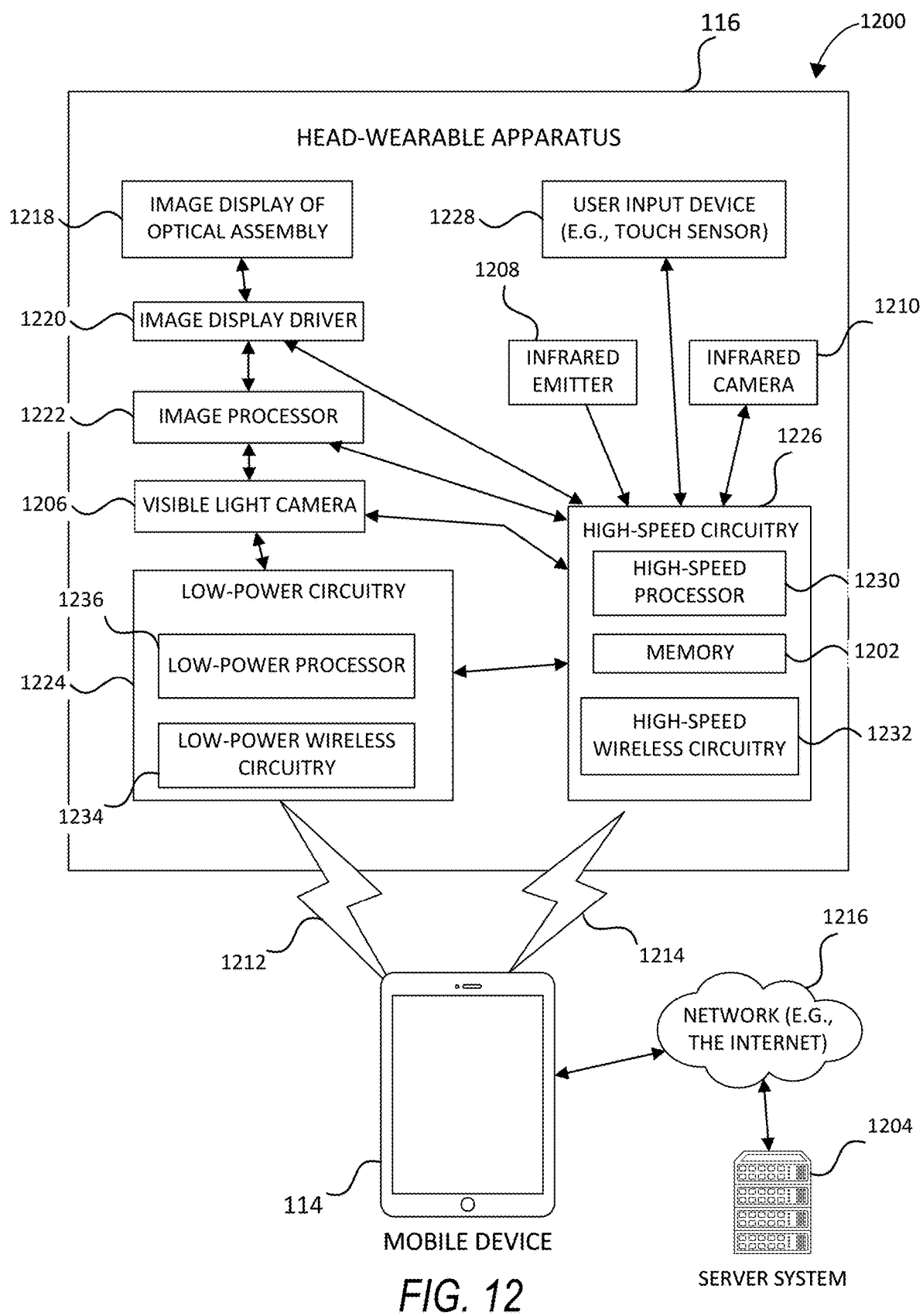
FIG. 12 illustrates a system in which a head-wearable apparatus may be implemented, in accordance with some examples.

FIG. 12 illustrates a system 1200 including a head-wearable apparatus 116 with a selector input device, according to some examples. FIG. 12 is a high-level functional block diagram of an example head-wearable apparatus 116 communicatively coupled to a mobile device 114 and various server systems 1204 (e.g., the interaction server system 110) via various networks 108.

The head-wearable apparatus 116 includes one or more cameras, each of which may be, for example, a visible light camera 1206, an infrared emitter 1208, and an infrared camera 1210.

The mobile device 114 connects with head-wearable apparatus 116 using both a low-power wireless connection 1212 and a high-speed wireless connection 1214. The mobile device 114 is also connected to the server system 1204 and the network 1216.

The head-wearable apparatus 116 further includes two image displays of the image display of optical assembly 1218. The two image displays of optical assembly 1218 include one associated with the left lateral side and one associated with the right lateral side of the head-wearable apparatus 116. The head-wearable apparatus 116 also includes an image display driver 1220, an image processor 1222, low-power circuitry 1224, and high-speed circuitry 1226. The image display of optical assembly 1218 is for presenting images and videos, including an image that can include a graphical user interface, to a user of the head-wearable apparatus 116.

The image display driver 1220 commands and controls the image display of optical assembly 1218. The image display driver 1220 may deliver image data directly to the image display of optical assembly 1218 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 1228 (e.g., touch sensor or push button), including an input surface on the head-wearable apparatus 116. The user input device 1228 (e.g., touch sensor or push button) is to receive from the user an input selection to manipulate the graphical user interface of the presented image.

The components shown in FIG. 12 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 1206 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 1202, which stores instructions to perform a subset or all of the functions described herein. The memory 1202 can also include a storage device.

As shown in FIG. 12, the high-speed circuitry 1226 includes a high-speed processor 1230, a memory 1202, and high-speed wireless circuitry 1232. In some examples, the image display driver 1220 is coupled to the high-speed circuitry 1226 and operated by the high-speed processor 1230 in order to drive the left and right image displays of the image display of optical assembly 1218. The high-speed processor 1230 may be any processor capable of managing high-speed communications and operation of any general computing system needed for the head-wearable apparatus 116. The high-speed processor 1230 includes processing resources needed for managing high-speed data transfers on a high-speed wireless connection 1214 to a wireless local area network (WLAN) using the high-speed wireless circuitry 1232. In certain examples, the high-speed processor 1230 executes an operating system such as a LINUX operating system or other such operating system of the head-wearable apparatus 116, and the operating system is stored in the memory 1202 for execution. In addition to any other responsibilities, the high-speed processor 1230 executing a software architecture for the head-wearable apparatus 116 is used to manage data transfers with high-speed wireless circuitry 1232. In certain examples, the high-speed wireless circuitry 1232 is configured to implement Institute of Electrical and Electronic Engineers (IEEE) 802.11 communication standards, also referred to herein as WiFi. In some examples, other high-speed communications standards may be implemented by the high-speed wireless circuitry 1232.

The low-power wireless circuitry 1234 and the high-speed wireless circuitry 1232 of the head-wearable apparatus 116 can include short-range transceivers (Bluetooth™) and wireless wide, local, or wide area network transceivers (e.g., cellular or WiFi). Mobile device 114, including the transceivers communicating via the low-power wireless connection 1212 and the high-speed wireless connection 1214, may be implemented using details of the architecture of the head-wearable apparatus 116, as can other elements of the network 1216.

The memory 1202 includes any storage device capable of storing various data and applications, including, among other things, camera data generated by the left and right visible light cameras 1206, the infrared camera 1210, and the image processor 1222, as well as images generated for display by the image display driver 1220 on the image displays of the image display of optical assembly 1218. While the memory 1202 is shown as integrated with high-speed circuitry 1226, in some examples, the memory 1202 may be an independent standalone element of the head-wearable apparatus 116. In certain such examples, electrical routing lines may provide a connection through a chip that includes the high-speed processor 1230 from the image processor 1222 or the low-power processor 1236 to the memory 1202. In some examples, the high-speed processor 1230 may manage addressing of the memory 1202 such that the low-power processor 1236 will boot the high-speed processor 1230 any time that a read or write operation involving memory 1202 is needed.

As shown in FIG. 12, the low-power processor 1236 or high-speed processor 1230 of the head-wearable apparatus 116 can be coupled to the camera (visible light camera 1206, infrared emitter 1208, or infrared camera 1210), the image display driver 1220, the user input device 1228 (e.g., touch sensor or push button), and the memory 1202.

The head-wearable apparatus 116 is connected to a host computer. For example, the head-wearable apparatus 116 is paired with the mobile device 114 via the high-speed wireless connection 1214 or connected to the server system 1204 via the network 1216. The server system 1204 may be one or more computing devices as part of a service or network computing system, for example, that includes a processor, a memory, and network communication interface to communicate over the network 1216 with the mobile device 114 and the head-wearable apparatus 116.

The mobile device 114 includes a processor and a network communication interface coupled to the processor. The network communication interface allows for communication over the network 1216, low-power wireless connection 1212, or high-speed wireless connection 1214. Mobile device 114 can further store at least portions of the instructions for generating binaural audio content in the mobile device 114's memory to implement the functionality described herein.

Output components of the head-wearable apparatus 116 include visual components, such as a display such as a LCD, a PDP, a LED display, a projector, or a waveguide. The image displays of the optical assembly are driven by the image display driver 1220. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 1204, such as the user input device 1228, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The biometric components may include a BMI system that allows communication between the brain and an external device or machine. This may be achieved by recording brain activity data, translating this data into a format that can be understood by a computer, and then using the resulting signals to control the device or machine.

The motion components include acceleration sensor components (e.g., accelerometer), gravitation sensor components, rotation sensor components (e.g., gyroscope), and so forth. The position components include location sensor components to generate location coordinates (e.g., a GPS receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 1212 and high-speed wireless connection 1214 from the mobile device 114 via the low-power wireless circuitry 1234 or high-speed wireless circuitry 1232.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, PDA, smartphone, tablet, ultrabook, netbook, laptop, multi-processor system, microprocessor-based or programmable consumer electronics, game console, STB, or any other communication device that a user may use to access a network.

"Communication network" refers, for example, to one or more portions of a network that may be an ad hoc network, an intranet, an extranet, a virtual private network (VPN), a local area network (LAN), a WLAN, a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein.

As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium," and "device-readable medium" mean the same thing and may be used interchangeably in this disclosure.

"Ephemeral message" refers, for example, to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," and "computer-storage medium" mean the same thing and may be used interchangeably in this disclosure.

The terms "machine-storage media," "computer-storage media," and "device-storage media" specifically exclude carrier waves, modulated data signals, and other such media, at least some of which are covered under the term "signal medium." "Non-transitory computer-readable storage medium" refers, for example, to a tangible medium that is capable of storing, encoding, or carrying the instructions for execution by a machine. "Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled, or owned by a user and with which the user interacts to perform an action, or interaction, on the user device, including interaction with other users or computer systems. "Carrier signal" refers to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device. "Client device" refers to any machine that interfaces to a communications network to obtain resources from one or more server systems or other client devices. A client device may be, but is not limited to, a mobile phone, desktop computer, laptop, PDA, smartphone, tablet, ultrabook, netbook, laptop, multi-processor system, microprocessor-based or programmable consumer electronics, game console, STB, or any other communication device that a user may use to access a network.

"Communication network" refers to one or more portions of a network that may be an ad hoc network, an intranet, an extranet, a VPN, a LAN, a WLAN, a WAN, a WWAN, a MAN, the Internet, a portion of the Internet, a portion of the PSTN, a POTS network, a cellular telephone network, a wireless network, a Wi-Fi® network, another type of network, or a combination of two or more such networks. For example, a network or a portion of a network may include a wireless or cellular network, and the coupling may be a CDMA connection, a GSM connection, or other types of cellular or wireless coupling. In this example, the coupling may implement any of a variety of types of data transfer technology, such as 1×RTT, EVDO technology, GPRS technology, Enhanced Data rates for GSM EDGE technology, third 3GPP including 3G, 4G networks, UMTS, HSPA, WiMAX, LTE standard, others defined by various standard-setting organizations, other long-range protocols, or other data transfer technology.

Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a FPGA or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein.

Changes and modifications may be made to the disclosed examples without departing from the scope of the present disclosure. These and other changes or modifications are intended to be included within the scope of the present disclosure, as expressed in the following claims.

What is claimed is:

1. A method comprising:
   storing, by a first entity, a first set of private identifiers associated with a first set of data;
   grouping, by the first entity, different subsets of the first set of private identifiers into respective buckets of a first plurality of buckets according to a grouping criterion, the grouping criterion comprising first private identifiers having one or more sequential characters that are identical and assigning the first private identifiers into respective buckets that match between the first entity and a second entity based on the identical sequential characters;
   transmitting, from the first entity to the second entity, a communication containing one or more bucket labels identifying the first plurality of buckets;
   transmitting, from the second entity to the first entity, a response communication indicating both one or more matching bucket labels and a numerical value indicative of a quantity of private identifiers in each matching bucket;
   applying a function to a subset of a second set of data, stored by the second entity, corresponding to second private identifiers associated with one or more buckets of a second plurality of buckets, the second private identifiers matching private identifiers associated with one or more buckets of the first plurality of buckets, the one or more buckets of the second plurality of buckets grouped by the second entity; and
   providing, to the first entity, a result of applying the function to the subset of the second set of data;
   selecting a group of common buckets of the first plurality of buckets corresponding to a second collection of buckets of the second plurality of buckets, the group of common buckets representing buckets that are common to both the first entity and the second entity;
   generating a first table that includes the private identifiers associated with the group of common buckets of the first plurality of buckets;
   duplicating one or more private identifiers in the first table based on the quantity of private identifiers being less than a specified quantity; and
   generating a second table that includes the private identifiers associated with the second collection of buckets and corresponding portions of the second set of data comprising private information maintained by the second entity.

2. The method of claim 1, further comprising:
   causing the second entity to store a second set of private identifiers associated with the second set of data; and
   causing the second entity to group different subsets of the second set of private identifiers into respective buckets of the second plurality of buckets according to the grouping criterion.

3. The method of claim 2, wherein the first set of private identifiers corresponds to a first set of users associated with the first entity; and
   wherein the second set of private identifiers corresponds to a second set of users associated with the second entity.

4. The method of claim 3, wherein a first user is common to both the first set of users and the second set of users; and
   wherein a first private identifier of the first set of private identifiers corresponding to the first user matches a second private identifier of the second set of private identifiers corresponding to the first user.

5. The method of claim 3, wherein a first user is excluded from the second set of users, wherein a first private identifier of the first set of private identifiers corresponding to the first user is different from each of the private identifiers in the second set of private identifiers, wherein a second user is excluded from the first set of users, wherein a second private identifier of the second set of private identifiers corresponding to the second user is different from each of the private identifiers in the first set of private identifiers.

6. The method of claim 1, wherein the result is computed using private information comprising the subset of the second set of data without revealing the private information to the first entity.

7. The method of claim 1, further comprising:
   selecting, by the first entity, a group of user identifiers for which the function needs to be computed based on private information maintained by the second entity;
   identifying a first set of buckets including a first bucket having a first label and a second bucket having a second label, wherein the first set of buckets includes private identifiers associated with the selected group of user identifiers;
   transmitting, by the first entity to the second entity, a communication including the first label and the second label;
   receiving, from the second entity, a response communication indicating that a third bucket of the second plurality of buckets has a matching label matching the first label and indicating a quantity of private identifiers included in the third bucket;
   determining that no private identifiers in the second bucket match any private identifiers of the second entity based on the response communication not indicating any matching label for the second label; and
   selecting only the first bucket to provide private identifiers to the function while excluding private identifiers in the second bucket, thereby reducing a number of operations performed by the function.

8. The method of claim 1, wherein the function comprises a secure multiparty computation (MPC) protocol function.

9. The method of claim 1, wherein the grouping criterion comprises selecting private identifiers having an identical first digit or an identical last digit for grouping into the respective buckets of the first plurality of buckets.

10. The method of claim 9, further comprising:
    searching the first set of private identifiers to identify a first group of private identifiers having a first digit in a same position;
    assigning the first group of private identifiers to a first bucket of the first plurality of buckets;
    searching the first set of private identifiers to identify a second group of private identifiers having a second digit in the same position;
    assigning the second group of private identifiers to a second bucket of the first plurality of buckets;
    searching the second set of private identifiers to identify a third group of private identifiers having the first digit in the same position;
    assigning the third group of private identifiers to a third bucket of the second plurality of buckets; and
    determining matching buckets between the first entity and the second entity based on the first bucket and third bucket sharing the first digit.

11. The method of claim 10, further comprising:
searching the second set of private identifiers to identify a third group of private identifiers having the first set of sequential characters that are identical;
assigning the third group of private identifiers to a third bucket of the second plurality of buckets;
searching the second set of private identifiers to identify a fourth group of private identifiers having a third set of sequential characters that are identical;
assigning the fourth group of private identifiers to a fourth bucket of the second plurality of buckets; and
identifying matching private identifiers between the first entity and the second entity based on the matching buckets.

12. The method of claim 1, further comprising:
selecting, by the first entity, a group of users;
identifying a subset of private identifiers of the first set of private identifiers associated with the group of users; and
identifying a first collection of buckets of the first plurality of buckets that include the subset of the private identifiers associated with the group of users.

13. The method of claim 12, further comprising:
identifying the second collection of buckets of the second plurality of buckets, the second collection of buckets corresponding to the first collection of buckets
selecting a group of common buckets of the first plurality of buckets corresponding to the identified second collection of buckets, the group of common buckets representing buckets that are common to both the first entity and the second entity.

14. The method of claim 1, further comprising:
identifying a portion of private identifiers in the second table that matches private identifiers in the first table; and
applying the function to the corresponding portions of the second set of data associated with the identified portion of the private identifiers.

15. The method of claim 1, further comprising:
encrypting, using a first encryption key, a first set of user identifiers stored by the first entity to generate a first encrypted version of the first set of user identifiers;
providing the first encrypted version of the first set of user identifiers to the second entity;
encrypting, using second and third encryption keys, the first encrypted version of the first set of user identifiers to generate a second encrypted version of the first set of user identifiers; and
encrypting, using a fourth encryption key, the second encrypted version of the first set of user identifiers to generate the first set of private identifiers.

16. The method of claim 15, further comprising:
receiving, at the first entity from the second entity, the response communication indicating the matching bucket labels and the quantity of private identifiers in each matching bucket;
shuffling, according to a shuffling pattern, the first set of user identifiers prior to encrypting using the first encryption key; and
excluding private identifiers from non-matching buckets when applying the function.

17. The method of claim 16, further comprising unshuffling the second encrypted version of the first set of user identifiers using the shuffling pattern to associate the first set of private identifiers with the first set of user identifiers.

18. A system comprising:
at least one processor; and
at least one memory component having instructions stored thereon that, when executed by the at least one processor, cause the at least one processor to perform operations comprising:
storing, by a first entity, a first set of private identifiers associated with a first set of data;
grouping, by the first entity, different subsets of the first set of private identifiers into respective buckets of a first plurality of buckets according to a grouping criterion, the grouping criterion comprising first private identifiers having one or more sequential characters that are identical and assigning the first private identifiers into respective buckets that match between the first entity and a second entity based on the identical sequential characters;
transmitting, from the first entity to the second entity, a communication containing one or more bucket labels identifying the first plurality of buckets;
transmitting, from the second entity to the first entity, a response communication indicating both one or more matching bucket labels and a numerical value indicative of a quantity of private identifiers in each matching bucket;
applying a function to a subset of a second set of data, stored by the second entity, corresponding to second private identifiers associated with one or more buckets of a second plurality of buckets, the second private identifiers matching private identifiers associated with one or more buckets of the first plurality of buckets, the one or more buckets of the second plurality of buckets grouped by the second entity; and
providing, to the first entity, a result of applying the function to the subset of the second set of data;
selecting a group of common buckets of the first plurality of buckets corresponding to a second collection of buckets of the second plurality of buckets, the group of common buckets representing buckets that are common to both the first entity and the second entity;
generating a first table that includes the private identifiers associated with the group of common buckets of the first plurality of buckets;
duplicating one or more private identifiers in the first table based on the quantity of private identifiers being less than a specified quantity; and
generating a second table that includes the private identifiers associated with the second collection of buckets and corresponding portions of the second set of data comprising private information maintained by the second entity.

19. A non-transitory computer-readable storage medium having stored thereon instructions that, when executed by at least one processor, cause the at least one processor to perform operations comprising:
storing, by a first entity, a first set of private identifiers associated with a first set of data;
grouping, by the first entity, different subsets of the first set of private identifiers into respective buckets of a first plurality of buckets according to a grouping criterion, the grouping criterion comprising first private identifiers having one or more sequential characters that are identical and assigning the first private identifiers into respective buckets that match between the first entity and a second entity based on the identical sequential characters;

transmitting, from the first entity to the second entity, a communication containing one or more bucket labels identifying the first plurality of buckets;

transmitting, from the second entity to the first entity, a response communication indicating both one or more matching bucket labels and a numerical value indicative of a quantity of private identifiers in each matching bucket;

applying a function to a subset of a second set of data, stored by the second entity, corresponding to second private identifiers associated with one or more buckets of a second plurality of buckets, the second private identifiers matching private identifiers associated with one or more buckets of the first plurality of buckets, the one or more buckets of the second plurality of buckets grouped by the second entity; and providing, to the first entity, a result of applying the function to the subset of the second set of data;

selecting a group of common buckets of the first plurality of buckets corresponding to a second collection of buckets of the second plurality of buckets, the group of common buckets representing buckets that are common to both the first entity and the second entity;

generating a first table that includes the private identifiers associated with the group of common buckets of the first plurality of buckets;

duplicating one or more private identifiers in the first table based on the quantity of private identifiers being less than a specified quantity; and generating a second table that includes the private identifiers associated with the second collection of buckets and corresponding portions of the second set of data comprising private information maintained by the second entity.

* * * * *